US011199118B2

(12) United States Patent
Dudar

(10) Patent No.: US 11,199,118 B2
(45) Date of Patent: Dec. 14, 2021

(54) SYSTEMS AND METHODS FOR REDUCING COLD START EMISSIONS FOR AUTONOMOUS VEHICLES

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 513 days.

(21) Appl. No.: 16/113,875

(22) Filed: Aug. 27, 2018

(65) Prior Publication Data

US 2020/0063626 A1    Feb. 27, 2020

(51) Int. Cl.
| | | |
|---|---|---|
| F02D 41/00 | (2006.01) | |
| F01N 3/20 | (2006.01) | |
| F02D 41/02 | (2006.01) | |
| F01N 11/00 | (2006.01) | |
| F01N 9/00 | (2006.01) | |

(52) U.S. Cl.
CPC ........... *F01N 3/2013* (2013.01); *F01N 9/005* (2013.01); *F01N 11/005* (2013.01); *F02D 41/024* (2013.01)

(58) Field of Classification Search
None
See application file for complete search history.

(56) References Cited

U.S. PATENT DOCUMENTS

| | | | |
|---|---|---|---|
| 6,938,410 B2 | 9/2005 | Glugla et al. | |
| 9,026,345 B2 | 5/2015 | Dudar et al. | |
| 9,459,622 B2 | 10/2016 | Abhyanker | |
| 2019/0299974 A1* | 10/2019 | Rauch | F02D 29/02 |
| 2020/0031332 A1* | 1/2020 | Koti | F01N 9/00 |

* cited by examiner

*Primary Examiner* — James M McPherson
(74) *Attorney, Agent, or Firm* — Geoffrey Brumbaugh; McCoy Russell LLP

(57) ABSTRACT

Methods and systems are provided for reducing emissions and improving fuel economy for vehicles participating in car-sharing models. In one example, a method comprises while a vehicle is stationary with an engine deactivated, actively raising a temperature of an exhaust catalyst positioned in an exhaust system of the engine to maintain the temperature of the exhaust catalyst above a threshold temperature until a subsequent request for engine torque to propel the vehicle is requested. In this way, cold-starts of engines for vehicles participating in car-sharing models may occur less frequently, and accordingly release of undesired emissions to the environment may be reduced.

18 Claims, 9 Drawing Sheets

SYSTEMS AND METHODS FOR REDUCING COLD START EMISSIONS FOR AUTONOMOUS VEHICLES

FIELD

The present description relates generally to methods and systems for controlling a vehicle engine to maintain a temperature of an exhaust catalyst above a threshold temperature in between times when the vehicle is operated.

BACKGROUND/SUMMARY

Modern vehicles are equipped with exhaust catalysts at which hydrocarbons are converted into less polluting gasses such as water and carbon dioxide, for example. In order for a catalyst to be efficient, the catalyst must have reached its operating temperature, often referred to as light-off temperature. Many attempts have been made to reduce the time needed for catalysts to reach their light-off temperature at a cold-start of an engine. While some of these attempts have been successful and the time needed to reach light off temperature has been reduced, cold starts of an engine where the exhaust catalyst temperature is below its light-off temperature are still responsible for a great proportion of total emissions of hydrocarbons from an engine. A significant reduction of emissions of hydrocarbons in the starting process of an engine would therefore generate a significant reduction of the total emissions of hydrocarbons from the engine.

The inventors herein have recognized that the above-mentioned issues may be exacerbated for some vehicles such as autonomous vehicles or other vehicles that participate in car-sharing models. Specifically, autonomous vehicles may allow for navigation of the vehicle to specific destinations in the absence of a driver by controlling steering, acceleration, braking, etc., where such control may be enabled by one or more sensors or other resources to detect nearby vehicles, pedestrians, and objects in or near the road. Autonomous vehicles and other vehicles participating in car-sharing models are projected to accumulate upwards of 250,000 miles in three years. Such vehicles are therefore likely to incur many short rest periods in between being operated, which may thus result in an increased number of engine startup events where the exhaust catalyst temperature is below the light-off temperature. Frequently starting the engine of such vehicles when the exhaust catalyst is below its light-off temperature may greatly increase cold-start emissions over time as compared to vehicles that do not participate in car-sharing models, and accumulate around 10-15K miles annually, on average.

U.S. Pat. No. 6,938,410 teaches for a vehicle with a variable displacement engine having a bank configuration with an exhaust catalyst associated with each bank, under conditions where a temperature of one particular exhaust catalyst drops below its light-off temperature while engine cylinders coupled to the one particular exhaust catalyst are deactivated, activating one or more of the deactivated engine cylinders to raise the temperature of the exhaust catalyst.

However, the inventors herein have also recognized potential issues with such a method. First, the method applies to a vehicle that is in operation where one bank of the engine is being utilized to propel the vehicle while the other bank is deactivated. Thus, the method of U.S. Pat. No. 6,938,410 does not readily lend itself to conditions where the vehicle is in a key-off state when temperature of the exhaust catalyst drops below its light-off temperature, such as may frequently occur in autonomous vehicles or other vehicles participating in car-sharing models. Second, U.S. Pat. No. 6,938,410 teaches activating the one or more deactivated engine cylinders until a predetermined threshold temperature of the exhaust catalyst is reached. However, for autonomous vehicles participating in car-sharing models, it may be known precisely when the next engine start event is expected to occur. Thus, for autonomous vehicles it may be desirable to raise the temperature of the exhaust catalyst as a function of when the autonomous vehicle will next be operated. In this way, fuel may be conserved and emissions may be reduced.

The inventors have herein further recognized the above-mentioned issues, and have developed systems and methods to at least partially address them. In one example, a method comprises while a vehicle is stationary with an engine not combusting air and fuel, actively raising a temperature of an exhaust catalyst positioned in an exhaust system of the engine to maintain the temperature of the exhaust catalyst above a threshold temperature until a subsequent request for engine torque to propel the vehicle is requested. In this way, release of undesired emissions to atmosphere may be reduced, and fuel economy may be improved.

In one example, the conditions where the vehicle is stationary with the engine not combusting air and fuel include a condition where the vehicle is unoccupied. In such an example, the vehicle may comprise one of a plurality of vehicles participating in a car-sharing model, where the subsequent request for engine torque to propel the vehicle is related to a scheduled pickup time of the vehicle by a customer. Actively raising the temperature of the exhaust catalyst may include one of activating the engine to combust air and fuel, or activating an electric heater coupled to the exhaust catalyst. Actively raising the temperature of the exhaust catalyst may be conducted when the temperature of the exhaust catalyst is predicted to be within a threshold number of degrees of the threshold temperature. Predicting when the temperature of the exhaust catalyst may be within the threshold number of degrees from the threshold temperature may include obtaining a plurality of measurements corresponding to the temperature of the exhaust catalyst while the vehicle is stationary with the engine not combusting air and fuel, and regressing the plurality of measurements into an exponential decay formula. With knowledge of when the temperature of the exhaust catalyst is predicted to drop below the threshold temperature, and further based on when a scheduled pickup time is to occur, exhaust catalyst temperature may be readily maintained above the threshold temperature until the scheduled pickup time, thus reducing emissions and improving fuel economy for fleets of vehicles participating in car-sharing models.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
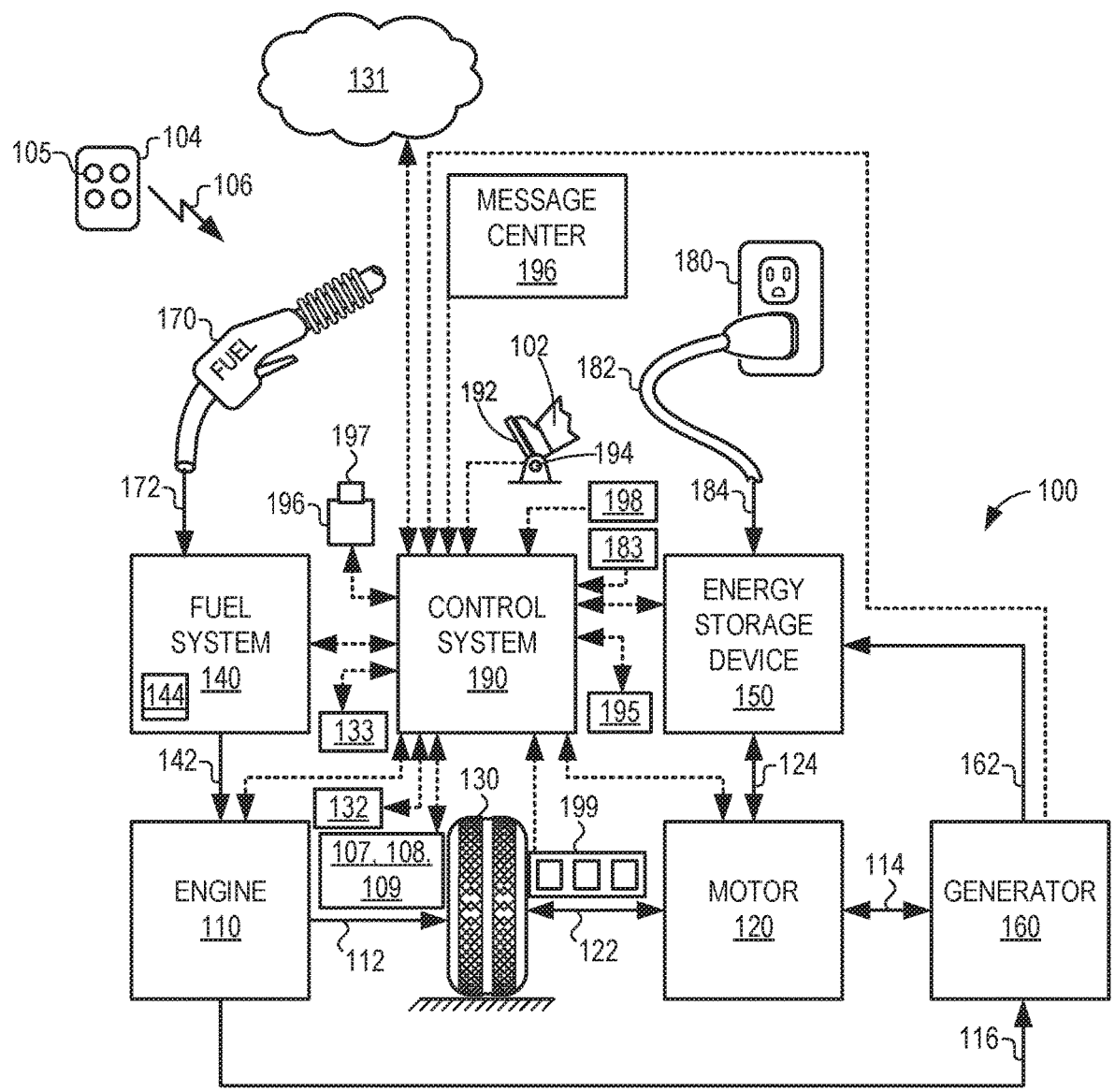
FIG. 1 schematically shows an example vehicle propulsion system.

The following description relates to systems and methods for coordinating environmentally friendly engine-startup events for vehicle participating in car-sharing models. Briefly, the following description relates to systems and methods for maintaining a temperature of an exhaust catalyst above a threshold temperature (e.g. light-off temperature) until a subsequent request for engine torque that involves a starting of the engine, is received via a controller of the vehicle. Specifically, the subsequent request may be related to a scheduled pickup-time of the vehicle as coordinated via a customer using a software application, or may be related to a request for engine-torque subsequent to a start/stop (S/S) event where the engine is deactivated briefly when torque demand for engine power is below a threshold. Accordingly, a hybrid vehicle equipped with means for participating in a car-sharing model and for S/S operation is depicted at FIG. 1. At FIG. 2, an engine system of the vehicle is depicted, illustrating the exhaust catalyst positioned in an exhaust of the vehicle. The vehicle may comprise a vehicle that is autonomously operated, thus a system for autonomously operating the vehicle is depicted at FIG. 3.

Figure 4A:
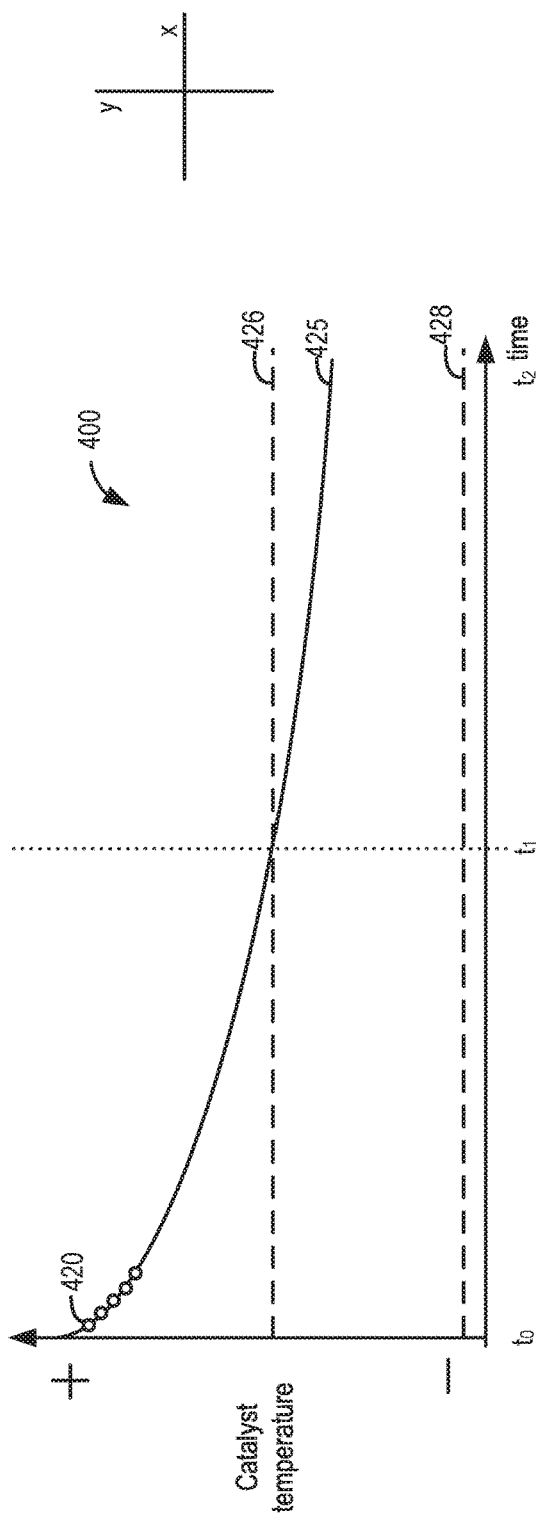
FIG. 4A graphically illustrates methodology to extrapolate an exhaust catalyst temperature decrease over time.

In order to maintain the temperature of the exhaust catalyst above the light-off temperature, a temperature decay rate of the exhaust catalyst at an engine-off event may be determined as graphically illustrated at FIG. 4A. In this way, it may be inferred when, after the engine-off event, the temperature of the exhaust catalyst is likely to drop below the light-off temperature. Furthermore, a predetermined temperature to which the exhaust catalyst is raised to in order to maintain the temperature of the exhaust catalyst above the light-off temperature may be variable depending, for example, on a relationship between when the subsequent request for engine torque occurs in relation to the time after the engine-off event when the temperature of the exhaust catalyst is predicted to drop below the light-off temperature.

Figure 5A:
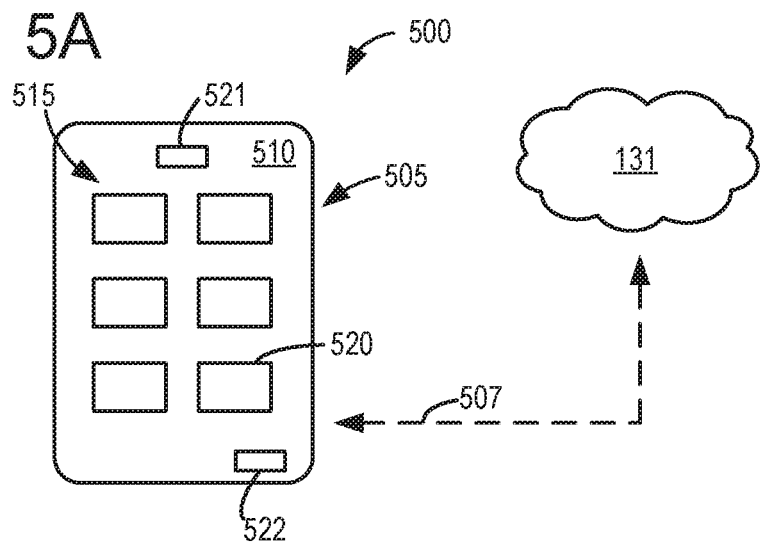
FIGS. 5A-5B schematically illustrate a software application for use with an electronic device such as a laptop or smartphone, etc.
Figure 5B:
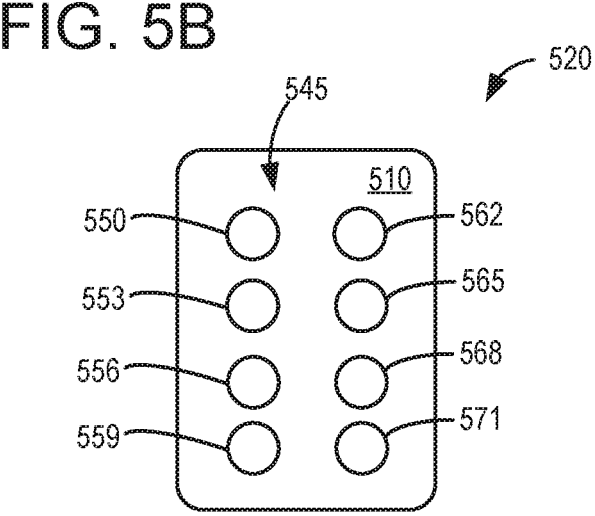
Figure 6:
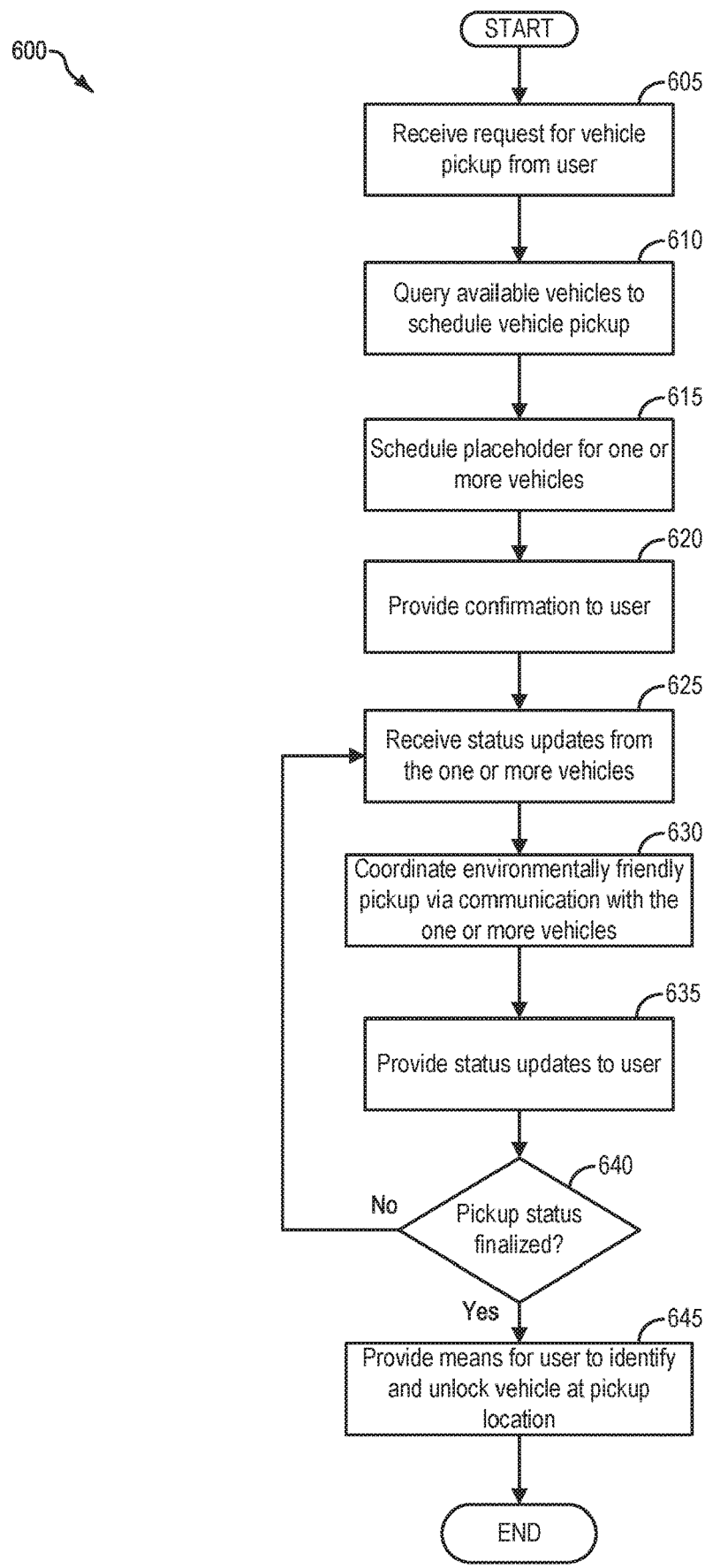
FIG. 6 depicts a high-level example methodology for operating the software application of FIGS. 5A-5B.
Figure 7A:
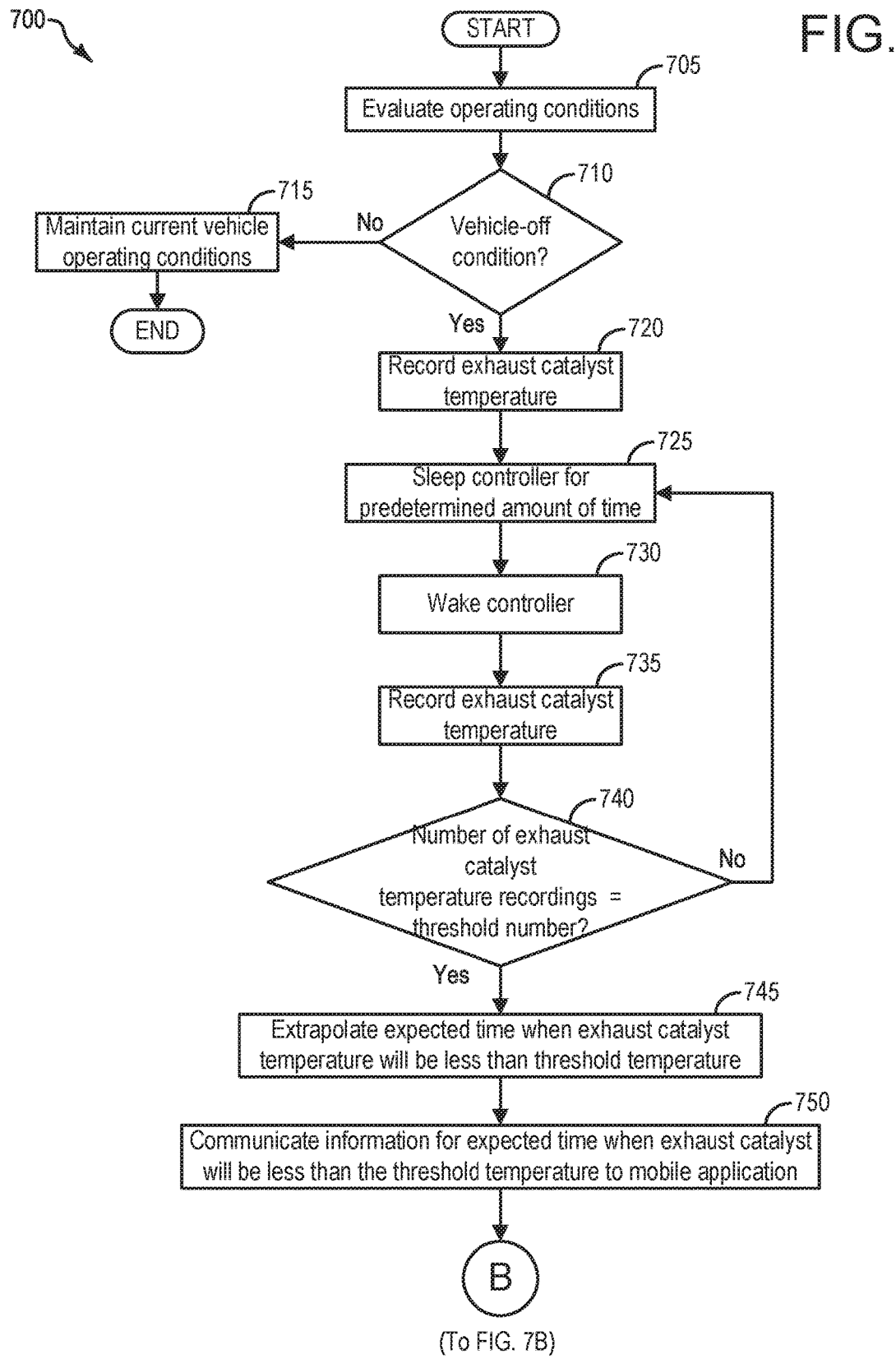
FIGS. 7A-7B depict a high-level example methodology for maintaining an exhaust catalyst above a light-off temperature until a subsequent request for engine torque, in conjunction with the methodology of FIG. 6.
Figure 7B:
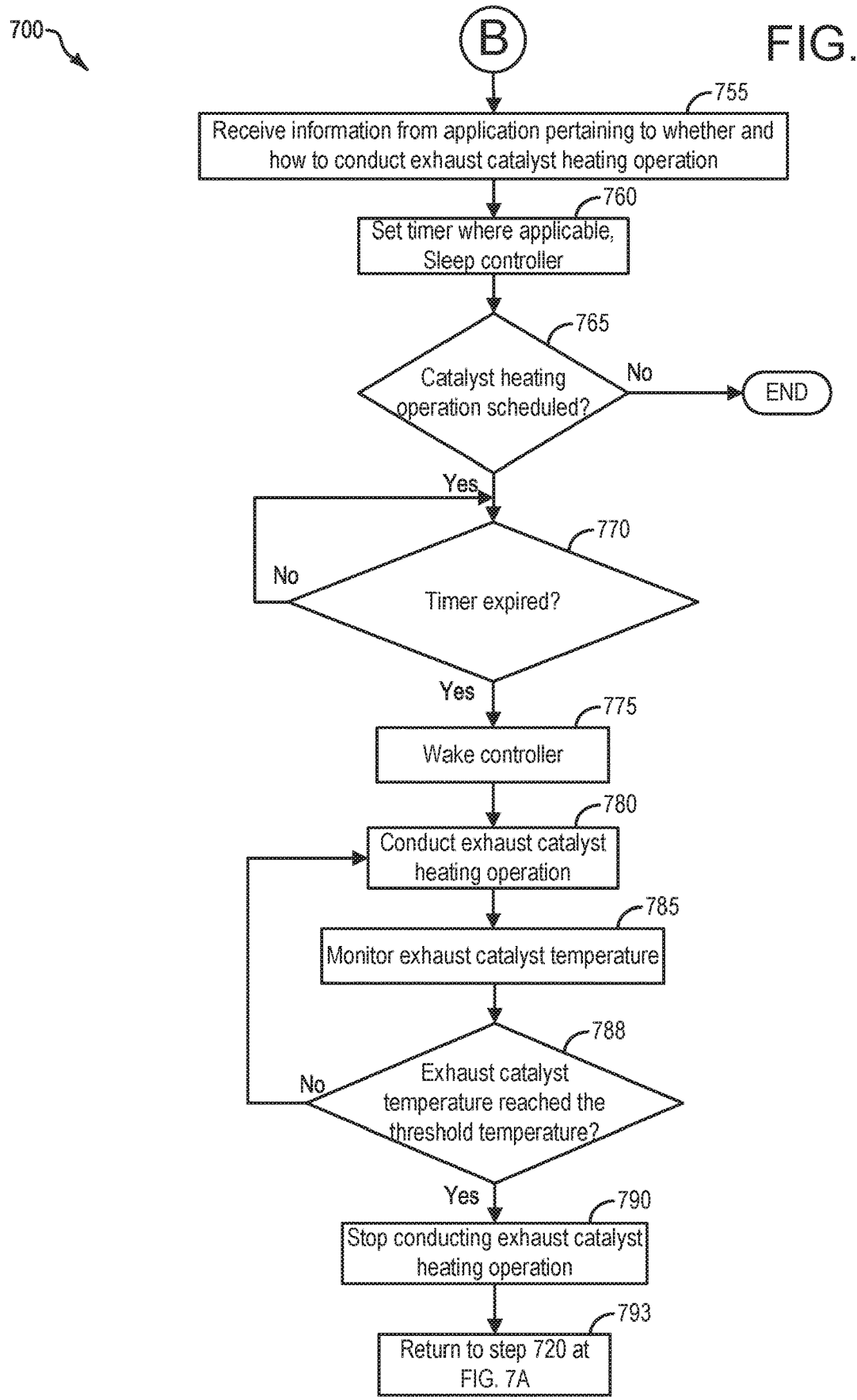
Figure 8:
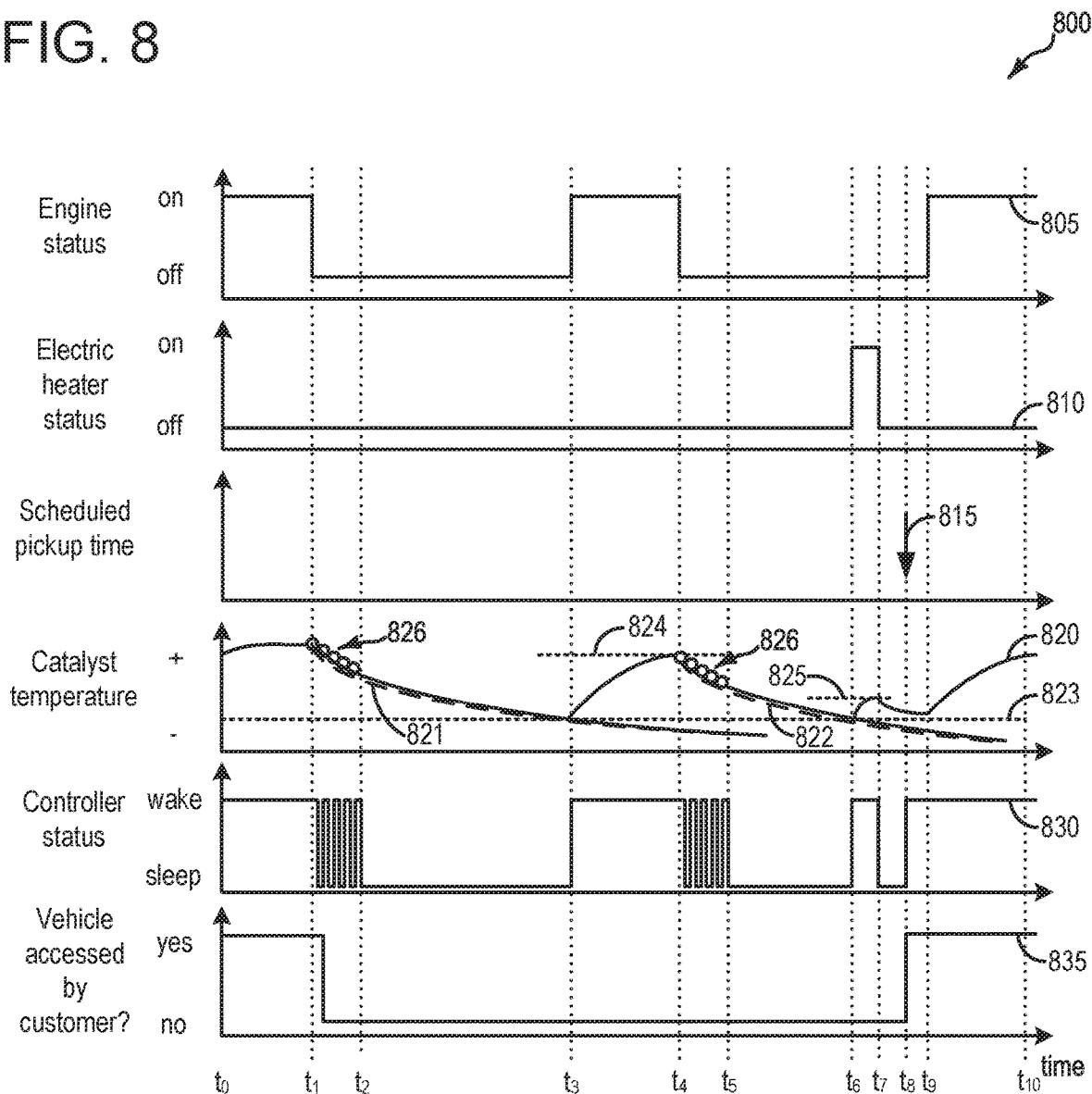
FIG. 8 depicts an example timeline for maintaining exhaust catalyst temperature above light-off temperature between scheduled vehicle operation.

For vehicles participating in car-sharing models, scheduled pickup times, and in some examples other instructions for coordinating the environmentally friendly engine-startup events, may be received at the controller of the vehicle via a software application, such as the software application depicted at FIGS. 5A-5B. FIG. 6 depicts a high-level methodology for operating the software application of FIGS. 5A-5B. FIGS. 7A-7B depicts high-level methodology for maintaining the temperature of the exhaust catalyst above the light-off temperature until the subsequent request for engine torque to start the engine is received via the controller. An example timeline for maintaining the temperature of the exhaust catalyst above the light-off temperature until the subsequent request for engine torque is received via the controller, is depicted at FIG. 8.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162. In some examples, the motor 120 and generator 160 may comprise a same motor/generator.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162.

As another example, engine 110 may be operated to drive motor 120 which may in turn provide a generator function to convert the engine output to electrical energy, where the electrical energy may be stored at energy storage device 150 for later use by the motor.

In some examples, engine 110 may be configured with a start/stop (S/S) feature 183 (also referred to herein as a S/S system) communicatively coupled to control system 190, wherein the control system 190 may automatically shut down (idle-stop) the internal combustion engine 110 without receiving operating input to shut down the engine, if selected idle-stop conditions, or in other words a set of predetermined conditions, are met. These may include, for example, torque demand being less than a threshold engine torque, vehicle speed below a threshold vehicle speed (e.g. 5 mph), the onboard energy storage device being sufficiently charged, no request being received for air-conditioning, etc. Likewise, the engine may be automatically restarted responsive to the torque demand being higher than the threshold, the battery (e.g. onboard energy storage device) requesting to be charged, an air-conditioning compressor requesting to be operated, etc. In one example, the engine may be restarted responsive to the operator applying the accelerator pedal after being stopped for a duration (e.g. at a traffic signal). The engine may be cranked unfueled via a motor (e.g. 120) or electric machine coupled to a crankshaft of the engine, until a desired engine speed is reached, after which the motor or electric machine may be disabled and engine fueling may be resumed. Thereafter engine combustion may be able to support engine spinning. As a result of the automatic start/stops, fuel consumption and exhaust emissions may be reduced.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, the fuel tank in the vehicle may be depressurized so that refueling may be performed. In examples where the vehicle comprises an autonomous vehicle, refueling may be initiated under the control of control system 190, where refueling may be initiated without manual actuation of refueling button 197.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art. Specifically, control system 190 may be coupled to a wireless communication device (not shown at FIG. 1 but see 284 at FIG. 2) for direct communication of the vehicle system 100 with wireless network 131. Using wireless communication via the wireless communication device 284 with wireless network 131, the vehicle system 100 may in some examples retrieve data from servers regarding current and/or upcoming ambient conditions (such as ambient humidity, temperature, pressure, precipitation, wind, etc.) from wireless network 131. As will be discussed in detail below, wireless network 131 may allow for communication between the control system 190 and a software application (see FIGS. 5A-5B and FIG. 6) that provides instructions to control system 190. Specifically with regard to the present disclosure, the software application may provide instructions to control system 190 regarding when to operate engine 110 in order to maintain an exhaust catalyst (see FIG. 2) above a light-off temperature between drive cycles.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, traffic information, etc. In one example, information received from the GPS may be utilized in conjunction with route learning methodology, such that routes commonly traveled by a vehicle may be learned by the vehicle control system 190. In some examples, other sensors 133, such as lasers, radar, sonar, acoustic sensors, etc., may be additionally or alternatively utilized in conjunction with the onboard navigation system to conduct route learning of commonly traveled routes by the vehicle. As one example, route-learning methodology may comprise information related to learned duration of stops along learned driving routines, where the engine may be stopped as a result of the S/S feature, or stopped for other reasons (e.g. between drive cycles for an autonomous vehicle participating in a car-sharing model). In some examples, such learned duration of stops where the engine may be shut down may include information acquired wirelessly via the control system (via GPS and/or internet, V2V, V2I2V, etc.) where such information may include traffic light status (e.g. how long until a particular traffic light turns green), traffic conditions that relate to how long a particular stop may last, etc. As will be discussed in detail below, such information may be used in order to maintain an exhaust catalyst temperature above a light-off temperature in between times when the engine is operated to propel the vehicle, such that engine restarts are more environmentally friendly as opposed to cold-starts of the engine where temperature of the exhaust catalyst is below its light-off temperature. Such examples may include S/S events, learned duration of particular vehicle stops (e.g. grocery store stops on particular days, routine work-related stops, etc.) that are not S/S events where the engine is deactivated, and/or examples where a vehicle engine is stopped for a duration in between scheduled times for vehicle pickup, such as may occur with autonomous vehicles or other non-autonomously operated vehicles participating in car-sharing models. By avoiding frequently restarting a vehicle engine under conditions where temperature of the exhaust catalyst is below its light-off temperature, undesired release of emissions to atmosphere may be reduced.

Vehicle system 100 may in some examples further include sensors dedicated to indicating the occupancy-state of the vehicle, for example seat load cells 107, door sensing technology 108, and onboard cameras 109.

Figure 2:
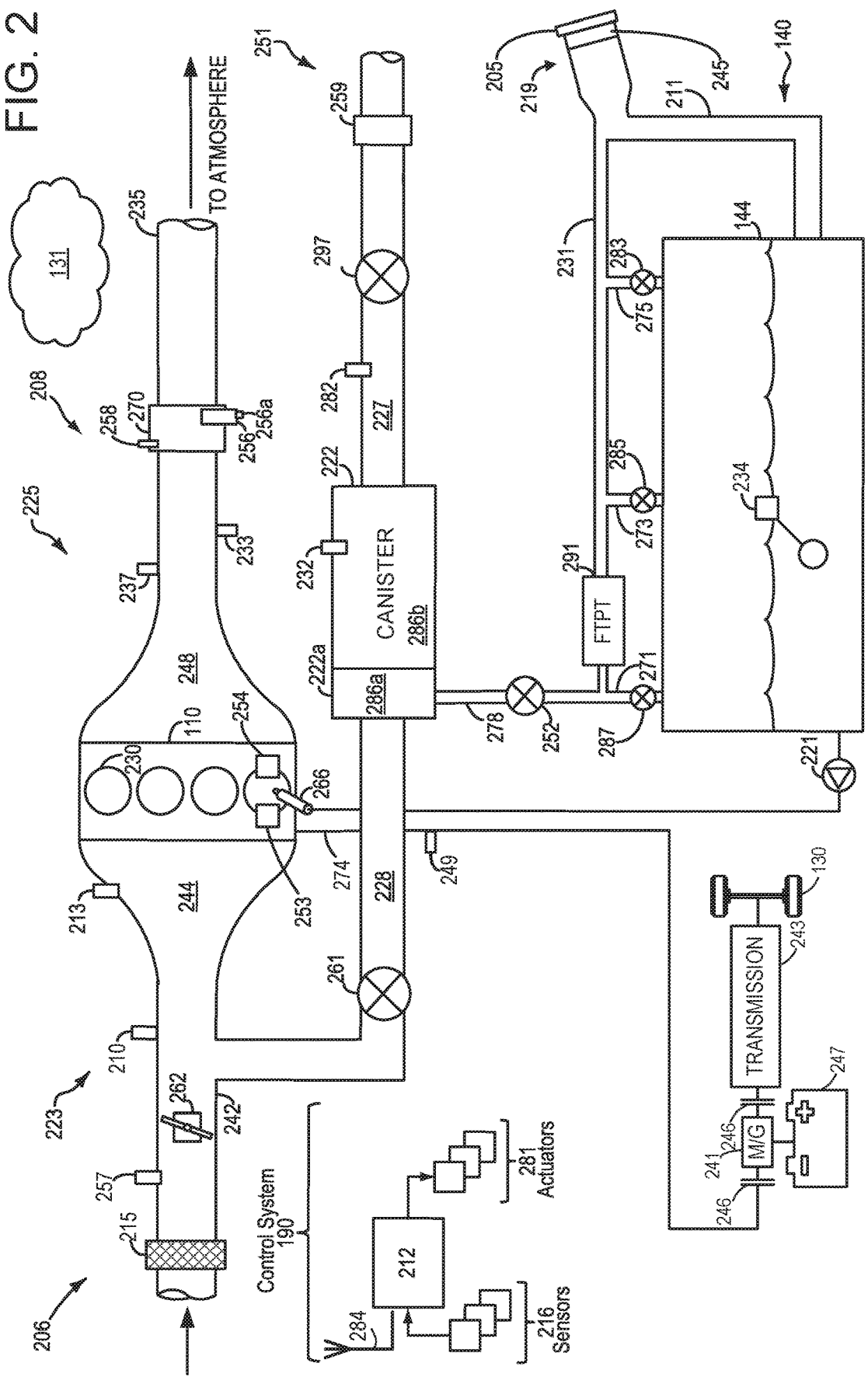
FIG. 2 schematically shows an example engine system with a fuel system and an evaporative emissions system.
Figure 3:
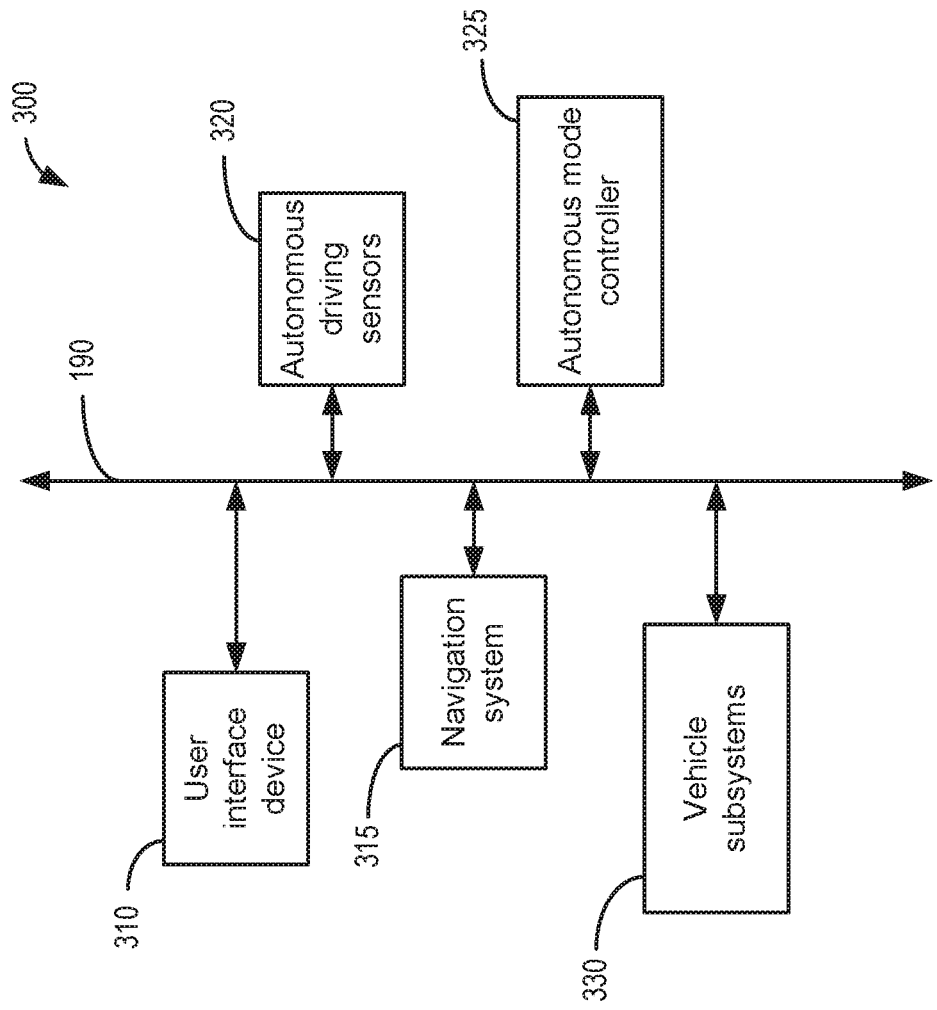
FIG. 3 schematically illustrates a block diagram of an example system for an autonomous vehicle.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 140. Emission control system 251 includes a fuel vapor container or canister 222 which may be used to capture and store fuel vapors.

The engine system 208 may include an engine 110 having a plurality of cylinders 230. While not explicitly shown, it may be understood that each cylinder may include one or more intake valve(s) and one or more exhaust valve(s). The engine 110 includes an engine air intake 223 and an engine exhaust system 225. The engine air intake 223 includes a throttle 262 in fluidic communication with engine intake manifold 244 via an intake passage 242. The throttle 262 may comprise an electronic throttle, which may be controlled via the vehicle controller sending a signal to actuate the throttle to a desired position. In such an example where the throttle is electronic, power to control the throttle to the desired position may be from an onboard energy storage device (e.g. 150), such as a battery. Further, engine air intake 223 may include an air box and filter 215 positioned upstream of throttle 262. The engine exhaust system 225 includes an exhaust manifold 248 leading to an exhaust passage 235 that routes exhaust gas to the atmosphere. The engine exhaust system 225 may include one or more emission control devices, or exhaust catalyst 270, which may be mounted in a close-coupled position in the exhaust. The one or more emission control devices may include a three-way catalyst, lean NOx trap, diesel particulate filter, oxidation catalyst, etc. In some examples, the one or more emission control devices may include an electric heater 256, the electric heater 256 configured to raise a temperature of the emission control device to a desired operating temperature (e.g. light-off temperature). The electric heater may be under control of controller 212, which may send a signal to an electric heater actuator 256a, thus actuating the electric heater on, or off. Furthermore, an exhaust catalyst temperature sensor 258 may be configured to indicate exhaust catalyst temperature to control system 190.

It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP. Alternatively, MAP may be inferred from alternate engine operating conditions, such as mass air flow (MAF), as measured by MAF sensor 210 coupled to the intake manifold.

Fuel system 140 may include a fuel tank 144 coupled to a fuel pump system 221. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 140 may be a return-less fuel system, a return fuel system, or various other types of fuel system. Fuel tank 144 may hold a plurality of fuel blends, including fuel with a range of alcohol concentrations, such as various gasoline-ethanol blends, including E10, E85, gasoline, etc., and combinations thereof. A fuel level sensor 234 located in fuel tank 144 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 140 may be routed to an evaporative emissions control system 251 which includes a fuel vapor canister 222 via vapor recovery line 231, before being purged to the engine air intake 223. Vapor recovery line 231 may be coupled to fuel tank 144 via one or more conduits and may include one or more valves for isolating the fuel tank during certain conditions. For example, vapor recovery line 231 may be coupled to fuel tank 144 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 144 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request (e.g., a vehicle operator initiated request), the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation, provided the fuel tank is coupled to the canister under such conditions). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 140.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 140 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 144 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 144 to fuel vapor canister 222. Fuel vapors may then be vented to atmosphere, or purged to engine intake system 223 via canister purge valve 261. As will be discussed in detail below, in some examples the FTIV may not be included, whereas in other examples, an FTIV may be included.

Fuel system 140 may be operated by controller 212 in a plurality of modes by selective adjustment of the various valves and solenoids. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 190. Control system 190 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, canister temperature sensor 232, MAF sensor 210, intake air temperature (IAT) sensor 257, and temperature sensor 258. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297, electric heater actuator 256a, etc. The controller may receive input data from the various sensors, process the input data, and trigger the actuators in response to the processed input data based on instruction or code programmed therein corresponding to one or more routines. Example control routines are described herein with regard to FIGS. 7A-7B.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode, or a remote start event may trigger a return to an awake mode. In some examples, a wakeup capability may enable a circuit to wake the controller in order to conduct diagnostics on the engine system, as will be discussed in further detail below. For example, a timer may be set that enables a circuit to wake the controller upon the timer elapsing.

Undesired evaporative emissions detection routines may be intermittently performed by controller 212 on fuel system 140 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced.

Intake manifold 244 is coupled to combustion chambers or cylinders 230 through a series of intake valves 253. The combustion chambers are further coupled to exhaust manifold 248 via a series of exhaust valves 254. While only one intake and one exhaust valve is depicted at FIG. 2, it may be understood that each combustion chamber or cylinder may include an intake and exhaust valve. In the depicted embodiment, a single exhaust manifold 248 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. While in this example illustration, a camshaft is not illustrated, one or more camshaft sensors (not shown) may be included in the vehicle propulsion system. Furthermore, crankshaft 274 may include crankshaft sensor 249. In some examples, one or both of crankshaft sensor 249 and/or camshaft sensors (not shown) may be utilized to infer a position of one or more pistons coupled to the engine cylinders 230.

In some examples, vehicle system 206 may be a hybrid vehicle with multiple sources of torque available to one or more vehicle wheels 130. In the example shown, vehicle system 206 includes engine 110 and an electric machine 241. Electric machine 241 may be a motor (e.g. same as 120) or a motor/generator. Crankshaft 274 of engine 110 and electric machine 241 are connected via a transmission 243 to vehicle wheels 130 when one or more clutches 246 are engaged. In the depicted example, a first clutch is provided between crankshaft 274 and electric machine 241, and a second clutch is provided between electric machine 241 and transmission 243. Controller 212 may send a signal to an actuator (not shown) of each clutch 246 to engage or disengage the clutch, so as to connect or disconnect crankshaft from electric machine 241 and the components connected thereto, and/or connect or disconnect electric machine 241 from transmission 243 and the components connected thereto. Transmission 243 may be a gearbox, a planetary gear system, or another type of transmission. The powertrain may be configured in various manners including as a parallel, a series, or a series-parallel hybrid vehicle, as discussed above at FIG. 1.

Electric machine 241 receives electrical power from a traction battery 247 (e.g. same as 150) to provide torque to vehicle wheels 130. Electric machine 241 may also be operated as a generator to provide electrical power to charge traction battery 247, for example during a braking operation.

The controller 212 may be coupled to a wireless communication device 284 for direct communication of the control system 190 and vehicle system 206 with wireless network 131, as discussed above.

Furthermore, as discussed herein, the methods and systems may be applicable to autonomous vehicles. Accordingly, turning now to FIG. 3, a block diagram of an example autonomous driving system 300 that may operate, for example, the vehicle system 100, described above at FIG. 1. Herein, the vehicle system 100 will be referred to simply as a "vehicle". The autonomous driving system 300, as shown, includes a user interface device 310, a navigation system 315 (e.g. same as 132), at least one autonomous driving sensor 320, an autonomous mode controller 325, and vehicle subsystems 330.

The user interface device 310 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 310 may be configured to receive user inputs. Thus, the user interface device 310 may be located in the passenger compartment (not shown) of the vehicle. In some possible approaches, the user interface device 310 may include a touch-sensitive display screen.

The navigation system 315 may be configured to determine a current location of the vehicle using, for example, a Global Positioning System (GPS) receiver configured to triangulate the position of the vehicle relative to satellites or terrestrial based transmitter towers. The navigation system 315 may be further configured to develop routes from the current location to a selected destination, as well as display a map and present driving directions to the selected destination via, for example, the user interface device 310.

The autonomous driving sensors 320 may include any number of devices configured to generate signals that help navigate the vehicle. Examples of autonomous driving sensors 320 may include a radar sensor, a lidar sensor, a vision sensor (e.g. a camera), vehicle to vehicle infrastructure networks, or the like. The autonomous driving sensors 320 may enable the vehicle to "see" the roadway and vehicle surroundings, and/or negotiate various obstacles while the vehicle 100 is operating in autonomous mode. The autonomous driving sensors 320 may be configured to output sensor signals to, for example, the autonomous mode controller 325.

The autonomous mode controller 325 may be configured to control one or more subsystems 330 while the vehicle is operating in the autonomous mode. Examples of subsystems 330 that may be controlled by the autonomous mode controller 325 may include a brake subsystem, a suspension subsystem, a steering subsystem, and a powertrain subsystem. The autonomous mode controller 325 may control any one or more of these subsystems 330 by outputting signals to control units associated with subsystems 330. In one example, the brake subsystem may comprise an anti-lock braking subsystem, configured to apply a braking force to one or more of wheels (e.g. 130). Discussed herein, applying the braking force to one or more of the vehicle wheels may be referred to as activating the brakes. To autonomously control the vehicle, the autonomous mode controller 325 may output appropriate commands to the subsystems 330. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

Whether the vehicle is autonomously operated, operated via a human driver, or some combination of both (e.g. human driver under some circumstances while autonomously operated under other circumstances), the vehicle systems described above may participate in car-sharing models. Discussed herein, a car-sharing model includes a model of car rental where people rent vehicles for short periods of time. In some examples, a customer may pay for the use of such a vehicle by the hour, as a function of miles driven, etc. As discussed above, such vehicles may accumulate much more mileage in a short period of time than vehicles that do not participate in car-sharing. Accordingly, such vehicles are likely to have many short rest periods and thus many key-off (e.g. where the vehicle is deactivated or turned off, including the engine) and crank events per day to restart the engine. If the crank events to restart the engine occur at a time when the exhaust catalyst (e.g. 270) has cooled to a temperature below its light-off temperature, then the engine start event is expected to be less environmentally friendly (e.g. increased undesirable amounts of tailpipe emissions) than engine starts where the exhaust catalyst temperature is above the light-off temperature. Thus, systems and methods are discussed herein to enable such vehicles to maintain exhaust catalyst temperature above the light-off temperature in between times where such vehicles are operated. In this way, release of undesired tailpipe emissions to atmosphere over the course of each day the vehicle is operated in the car-sharing model may be reduced. Similar methodology may additionally or alternatively be applied to vehicles with S/S capability.

In order to achieve such results, the systems and methods discussed herein take advantage of the fact that customers schedule pickup of such vehicles ahead of time and/or that traffic information, learned driving habits, learned route information, etc., may be obtained via the controller of such vehicles. Thus, with a priori knowledge of when a vehicle that is not in operation will be requested to resume operation that involves a request for engine torque to start the engine, the control system may employ methodology to maintain the exhaust catalyst temperature above the light-off temperature between short rest periods where the engine is stopped from combusting air and fuel, discussed in further detail below. Furthermore, as discussed, such methodology is not limited to vehicles participating in car-sharing models. Specifically, for vehicles equipped with the capability of route-learning methodology and/or V2V/V2I/V2I2V technology there may be opportunity to predict when the vehicle engine will be requested to be restarted, thus enabling the methodology of maintaining exhaust catalyst temperature above the light-off temperature between engine operation conditions.

In order to maintain exhaust catalyst temperature above the light-off temperature between times when such vehicles are operated, it may be understood that the methodology discussed herein includes one of activating an electric heater (e.g. 256) coupled to the exhaust catalyst, or operating the engine to combust air and fuel in order to increase temperature of the exhaust catalyst. In some examples, it may be determined via the controller (e.g. 212) whether to utilize the electric heater to raise exhaust catalyst temperature, or to activate the engine to combust air and fuel to raise exhaust catalyst temperature, based on a fuel economy penalty incurred for the raising of the temperature. In other examples, such instructions may be retrieved from the software application (see FIGS. 5A-6). In either case, in some instances it may be less energetically costly to raise exhaust catalyst temperature by using energy stored at the onboard energy storage device, as compared to activating the engine to combust air and fuel. In other situations, it may be less energetically costly to raise exhaust catalyst temperature by activating the engine to combust air and fuel. Furthermore, in a case where the vehicle is not occupied at a time when raising the exhaust catalyst temperature is desired, strategy to raise exhaust catalyst temperature when activating the engine may include fueling a number of cylinders less than the maximum number of cylinders available (e.g. fueling one out of four). Although such strategy may introduce issues related to noise, vibration and harshness (NVH), since the vehicle is not occupied such issues may thus go unnoticed. Furthermore, whether the number of cylinders fueled in order to raise exhaust catalyst temperature is less than the maximum number available, or all cylinders available, spark timing may be controlled to be retarded in order to raise the exhaust catalyst temperature as rapidly as possible.

In order to implement such methodology, it may be understood that accurate knowledge of exhaust catalyst temperature may be requested during the duration of time between times when the vehicle is operated to combust air and fuel in order to propel the vehicle. In other words, if the controller is to employ strategy to raise exhaust catalyst temperature as a function of when the vehicle is predicted or scheduled to be again operated, then such strategy may rely on accurate knowledge of exhaust catalyst temperature in order to determined when it is desirable to raise exhaust catalyst temperature, and by how much, as a function of when the vehicle will again be operated.

Accordingly, turning to FIG. 4A, methodology for determining exhaust catalyst temperature during times when a vehicle is not in operation, or at least when the vehicle engine has been deactivated for a period of time (for example in a S/S situation), is graphically depicted as timeline 400. Exhaust catalyst temperature is depicted on the y axis, and time is depicted on the x axis. Exhaust catalyst temperature may increase (+) or decrease (−), over time.

While not explicitly illustrated, at time t0 it may be understood that the vehicle engine has been deactivated (fuel injection and spark to the engine stopped), and the vehicle is in a key-off condition. It may be further understood that at time t0, the controller is in a sleep mode of operation. In other words, after the vehicle has been deactivated, the controller went into a sleep mode of operation. Open circles 420 depict measurements of exhaust catalyst temperature. Five such open circles are indicated. For each circle 420 that depicts a measurement of exhaust catalyst temperature, it may be understood that the controller is awoken from sleep mode, exhaust catalyst temperature is recorded via the controller and stored, and then the controller is returned to the sleep mode. While only five such measurements are depicted between time t0 and t1, it may be understood that more measurements may be taken, for example 10 measurements. The measurements may allow for regression of the measurements into an exponential decay formula using, for example, least squares curve fitting. Such a formula may be of the form: Temperature decay=$a * e(-t/tc)$, where a is starting exhaust catalyst temperature, t is time, and tc is a time constant.

In this way, the controller may model the exponential temperature decay of the exhaust catalyst, where such modeling is based on empirically recorded measurements. At FIG. 4A, such a modeled temperature decay is represented by line 425.

The methodology described with respect to FIG. 4A for obtaining a modeled temperature decay of the exhaust catalyst represents a viable option for obtaining such information, as predicting such a decay equation without empirical data is challenging due to a large number of factors that impact temperature decay of the exhaust catalyst, including but not limited to wind, ambient temperature, parking venue, heat rejection from the engine from the previous drive cycle, etc. However, in some examples where the temperature decay of the exhaust catalyst is modeled based on empirically recorded data, the model may be further refined based on current and forecast weather conditions. Specifically the rate of exponential decay may be further based on current and forecast weather conditions including but not limited to ambient temperature, precipitation, humidity, wind, diurnal cycle, etc. Such information may be retrieved from one or more servers via wireless communication between the control system (e.g. 190) of the vehicle and the internet, for example.

By modeling the rate of temperature decay of the exhaust catalyst in this way, it may be predicted at what time the temperature of the exhaust catalyst may drop below the light-off temperature. At FIG. 4A, light-off temperature is represented by dashed line 426. Thus, based on the modeled temperature decay of the exhaust catalyst represented by line 425, the exhaust catalyst temperature is predicted to drop below the light-off temperature just after time t1. Accordingly, if a pick-up of the vehicle is scheduled for a time between time t0 and t1, then the exhaust catalyst temperature is predicted to be above the light-off temperature and no mitigating action may be taken to raise exhaust catalyst temperature. However, if the next scheduled pickup time of the vehicle is after time t1, or if the next inferred request for engine torque to start the engine (in the case of a S/S event for example) is after time t1, then mitigating action such as starting the engine or activating the electric heater coupled to the exhaust catalyst may be taken prior to time t1 in order to maintain the temperature of the exhaust catalyst above the light-off temperature until the next requested engine-start event.

There may be circumstances however, where temperature of the exhaust catalyst is predicted to decay to within a threshold number of degrees from ambient temperature prior to the next vehicle pickup event, where ambient temperature is represented by line 428 at FIG. 4A, before the next scheduled event. The threshold number of degrees may be 30 degrees C. or less, 20 degrees C. or less, 10 degrees C. or less, 5 degrees C. or less, etc. In such a case, if the temperature of the exhaust catalyst is predicted to decay to within the threshold number of degrees from ambient temperature, then no mitigating action may be taken to maintain temperature of the exhaust catalyst, and the next engine start event may comprise a cold-start event.

Under circumstances where the vehicle is scheduled to be picked up at a time after temperature of the exhaust catalyst is predicted to be below the light-off temperature or if it is inferred that the next engine-start event will occur after temperature of the exhaust catalyst is predicted to be below light-off temperature, mitigating action may be taken to raise the temperature of the exhaust catalyst when temperature of the exhaust catalyst is predicted to be within a threshold number of degrees from the light-off temperature. The threshold number of degrees from the light-off temperature may comprise 30 degrees C. or less, 20 degrees C. or less, 10 degrees C. or less, 5 degrees C. or less, etc. In other words, it may be desirable to take mitigating action to raise temperature of the exhaust catalyst near the time (e.g. just prior to) when the exhaust catalyst is predicted/modeled to drop below the light-off temperature. Depending on the time of the next scheduled vehicle pick-up event, the amount by which the temperature of the exhaust catalyst may be raised may be variable, discussed below with regard to FIGS. 4B-4C.

Figure 4C:
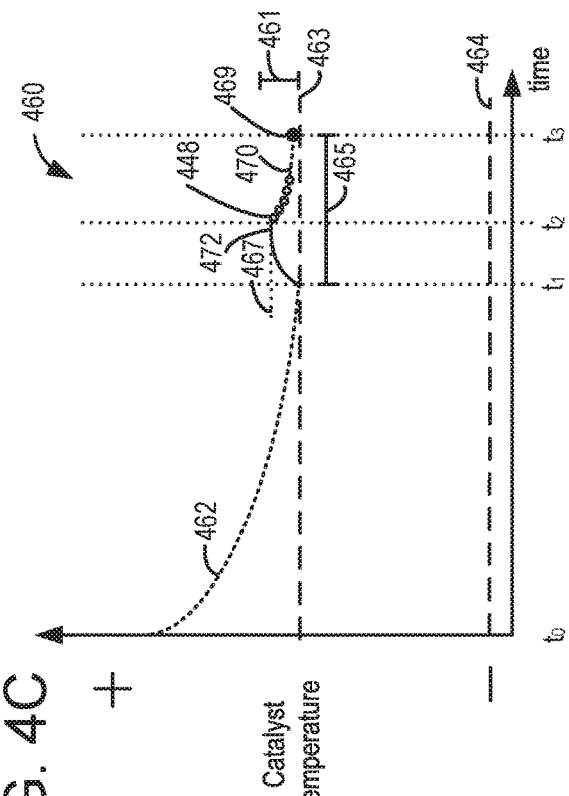
FIGS. 4B-4C graphically illustrate how to maintain temperature of an exhaust catalyst above a light-off temperature during key-off conditions until the vehicle operated.
Figure 4B:
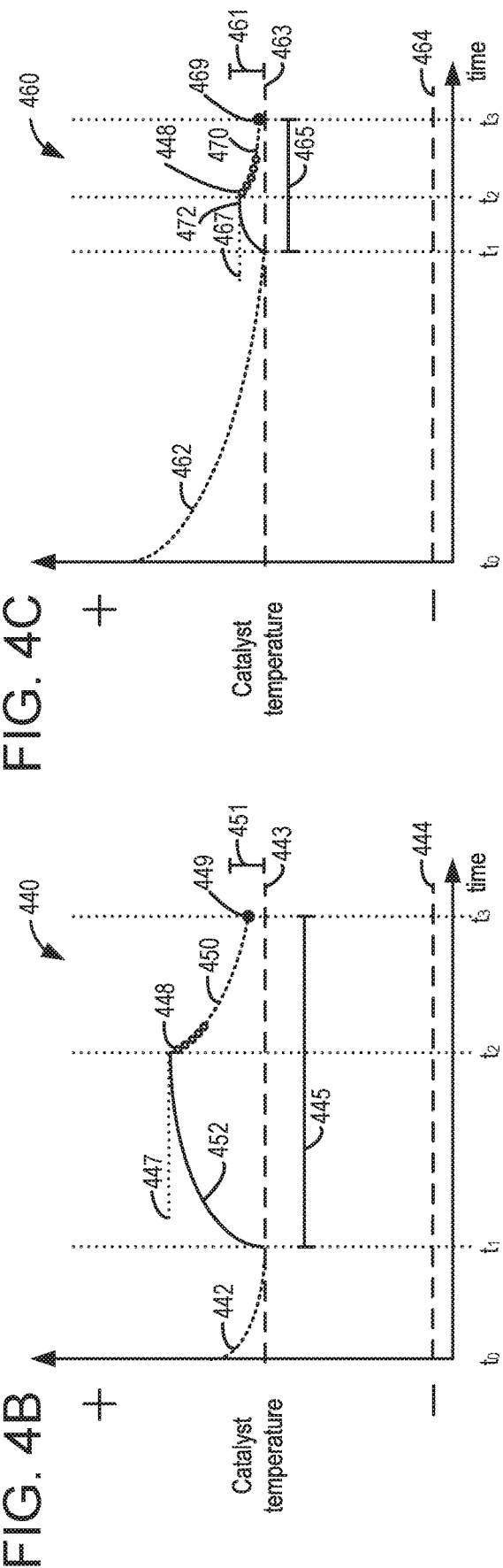

Turning now to FIG. 4B, an example timeline 440 is depicted, illustrating how temperature of the exhaust catalyst may be raised under circumstances where the next scheduled pickup time of the vehicle is substantially after the time where it is predicted/modeled that the temperature of the exhaust catalyst will drop below the light-off temperature. For illustrative purposes "substantially after" in this example timeline may be understood to mean that the next scheduled pickup time of the vehicle is approximately 30 minutes after it is predicted that the exhaust catalyst will drop below the light-off temperature. Example timeline 440 may also apply to a situation where a vehicle route has been learned, and it is inferred that the particular engine-off stop event corresponds to a learned stop where the vehicle operator typically spends a particular amount of time at the location prior to again requesting the engine to be restarted at approximately 30 minutes after it is predicted that the exhaust catalyst will drop below the light-off temperature. Such examples are meant to be illustrative examples.

Accordingly, dashed line 442 represents modeled temperature decay of the exhaust catalyst. In other words, the measurements as to exhaust catalyst temperature may be understood to have been obtained prior to time to, and the data has been modeled as described above with regard to FIG. 4A to yield temperature decay represented by line 442. As above at FIG. 4A, exhaust catalyst temperature is depicted on the y-axis, and time is depicted on the x-axis. Light-off temperature is depicted by dashed line 443, and ambient temperature is depicted as dashed line 444.

Temperature of the exhaust catalyst is predicted/modeled to drop below the light-off temperature just after time t1. However, as mentioned above and depicted by line 445, the next scheduled pickup time of the vehicle or other inferred engine-start request is 30 minutes after the exhaust catalyst is predicted to drop below the light-off temperature. Accordingly, at time t1, while not explicitly illustrated, it may be understood that the engine is activated with fuel injection and spark provided to the engine, with spark retarded in order to rapidly warm the catalyst. Between time t1 and t2, actual temperature of the exhaust catalyst (represented by line 452) rises, represented to a predetermined threshold temperature represented by dashed line 447. At time t2, with the temperature of the catalyst having reached the threshold temperature represented by line 447, the engine is deactivated.

The threshold temperature represented by line 447 may be determined via the vehicle controller as a function of the rate of temperature decay of the exhaust catalyst just prior to the engine being activated, in other words the rate of temperature decay represented by line 442. The threshold temperature 447 may be understood to be selected based on the exhaust catalyst temperature being above the light-off temperature, represented by line 443, at the time of the next scheduled pickup of the vehicle, represented by filled circle 449 at time t3. Said another way, the engine may be activated to raise temperature of the exhaust catalyst such that the subsequent decay in temperature will not result in the temperature of the exhaust catalyst being below the light-off temperature at the next scheduled vehicle pickup event, represented here as 449. In other words, the amount of time the engine is activated and the threshold temperature 447 of the exhaust catalyst may be a function of the rate at which the exhaust catalyst temperature declined just prior to the engine being activated, and further a function of the next scheduled pickup time or other inferred subsequent request for engine torque to star the engine. In this way, the amount of times the engine may be activated in order to maintain exhaust catalyst temperature above the light-off temperature until the next scheduled pickup time may be minimized. For example, it may be desirable if possible to only activate the engine one time in order to maintain exhaust catalyst temperature above the light-off temperature until the next scheduled pickup time. However, it is herein recognized that there may be some situations where the next scheduled pickup time is such that the engine may need to be activated more than one time to maintain exhaust catalyst temperature above light-off temperature until the next scheduled pickup time. For example, in a situation where the next scheduled pickup time is around 1.5-2 hours after the engine has initially been deactivated, more than one exhaust catalyst temperature raising operation may be conducted. However, it may be understood that it is desirable to minimize the number of times the exhaust catalyst temperature raising operation is conducted.

Furthermore, while the threshold temperature (e.g. 447) that the exhaust catalyst is raised to may be a function of the rate of decay of the exhaust catalyst just prior to the conducting of the exhaust catalyst temperature raising operation, conditions may change such that the subsequent temperature decay rate (e.g. 450) is different than the previous temperature decay rate (e.g. 442). For example, an amount of heat rejection from the engine may be different, ambient weather conditions such as an amount of precipitation, amount of wind, time of day in terms of diurnal cycle, ambient temperature, etc., may be different. Thus, it may be understood that once the temperature of the exhaust catalyst is raised to the threshold temperature 447, the methodology discussed above at FIG. 4A may again be used to model the temperature decay rate. If the empirically determined temperature decay rate is substantially different than that expected based on the previous decay rate (e.g. 442), then there may be circumstances where the exhaust catalyst temperature raising operation may be conducted again in order to maintain temperature of the exhaust catalyst above the light-off temperature until the next scheduled pickup time.

Accordingly, at time t2, responsive to the engine being deactivated, it may be understood that the controller may be put to sleep, and reawoken at, for example, 5 minute intervals to measure exhaust catalyst temperature (where the controller is slept between measurements as described above). Such measurements are depicted at FIG. 4B as open circles 448. Based on the measurements, as discussed above with regard to FIG. 4A, temperature decay rate of the exhaust catalyst may be modeled via the controller. In this example timeline depicted at FIG. 4B, the second modeled temperature decay of the exhaust catalyst is represented by line 450. The modeled decay rate of the exhaust catalyst temperature is illustrated as being above the light-off temperature represented by dashed line 443 at time t3 which comprises the next scheduled vehicle pickup event 449. Thus, no further exhaust catalyst temperature raising operations are scheduled between time t2 and t3, and at time t3 the vehicle is picked up via a customer.

It may be further understood that it may be desirable for the exhaust catalyst temperature to be within a threshold number of degrees from the light-off temperature at the time of pickup of the vehicle by the customer. The threshold number of degrees may comprise within 30 degrees C. or less, 20 degrees C. or less, 10 degrees C. or less, 5 degrees C. or less, etc. At FIG. 4B, the threshold number of degrees is depicted as 451. In this way, the amount of time the engine is activated to raise temperature of the exhaust catalyst may be understood to comprise an optimal amount of time with regard to maintaining exhaust catalyst temperature above the light-off temperature until the next subsequent engine-start request. In other words, the engine is not activated to raise temperature of the exhaust catalyst to a level such that the exhaust catalyst temperature is much higher than light-off temperature (e.g. 50 degrees C. or greater higher than light-off temperature at the time of pickup), as any amount by which the temperature is above the light-off temperature suffices to reduce undesired emissions released to atmosphere at engine start events. In this way, fuel economy impact due to the conducting of the exhaust catalyst temperature raising operation may be minimized.

Turning now to FIG. 4C, another example timeline 460 is depicted, illustrating a situation where the scheduled pickup time (or other inferred subsequent engine restart request), represented by filled circle 469 is a shorter amount of time (e.g. 12 minutes) after the exhaust catalyst temperature is predicted/modeled to drop below the light-off temperature. It may be understood that the shorter amount of time for FIG. 4C is in relation to the longer amount of time (e.g. 30 minutes) depicted at FIG. 4B. This shorter amount of time is depicted as 465 at FIG. 4C (compare to 445 at FIG. 4B). As per FIGS. 4A-4B, exhaust catalyst temperature is depicted on the y-axis, and time is depicted on the x-axis. Light-off temperature is represented by dashed line 463, and ambient temperature is represented by dashed line 464.

At time t0, it may be understood that the vehicle is in a key-off mode, with the engine deactivated. While not explicitly illustrated, it may be understood that the methodology for modeling decay rate of the exhaust catalyst temperature as discussed above with regard to FIG. 4A has been conducted, and thus dashed line 462 represents the modeled temperature decay rate of the exhaust catalyst. The temperature of the exhaust catalyst is thus predicted/modeled to drop below the light-off temperature represented by dashed line 463 just after time t1. Accordingly, at time t1, while not explicitly illustrated, it may be understood that the engine is activated to combust air and fuel, with spark provided to engine cylinders retarded in order to rapidly warm the exhaust catalyst. Accordingly, between time t1 and t2, temperature of the exhaust catalyst rises to the threshold temperature, represented by dashed line 467. As discussed above, the threshold temperature 467 (represented by line 472) may be a function of the rate at which the exhaust catalyst temperature declined just prior to the engine being activated (e.g. 462), a function of the next scheduled pickup time (or other inferred subsequent engine-restart request), represented by filled circle 469, and a function of the temperature of the exhaust catalyst being within a threshold number of degrees of the light-off temperature at the time of the next scheduled vehicle pickup, the threshold number of degrees represented by 461. As discussed at FIG. 4B, the threshold number of degrees may comprise 30 degrees C. or less, 20 degrees C. or less, 10 degrees C. or less, 5 degrees C. or less, etc. Because the pickup time comprises a shorter amount of time at FIG. 4C as compared to that at FIG. 4B, it may be understood that the threshold temperature 467 is lower (less than) the threshold temperature depicted at FIG. 4C (e.g. 447). In other words, the amount by which the exhaust catalyst temperature is raised at FIG. 4C is lower than the amount depicted at FIG. 4B, while still ensuring that the exhaust catalyst temperature is above the light-off threshold (and within the threshold number of degrees of light-off temperature) at the time of the next scheduled vehicle pickup event 469.

Accordingly, at time t2, with the threshold temperature having been attained, it may be understood that the engine is deactivated. Between time t2 and t3, the methodology depicted at FIG. 4A and further discussed at FIG. 4B is again conducted in order to accurately model the temperature decay rate of the exhaust catalyst. Specifically, between time t2 and t3 a number of measurements of exhaust catalyst temperature represented by open circles 448 are obtained via the controller, by waking the controller to obtain the measurements and sleeping the controller between the obtaining of such measurements. In this way, the temperature decay rate of the exhaust catalyst is again modeled, as represented by line 470.

With the modeled temperature decay rate indicating that the temperature of the exhaust catalyst is expected to be greater than the light-off temperature at the next scheduled pickup time represented by filled circle 469 at time t3, no additional exhaust catalyst temperature heating operations are conducted or scheduled between time t2 and t3. At time t3 the vehicle is picked up by the customer.

While the above description with regards to FIGS. 4A-4C included activation of the engine in order to raise exhaust catalyst temperature to the threshold temperature while the vehicle is not in operation, it may be understood that in other examples, the temperature of the exhaust catalyst may be alternatively raised via activation of the electric heater (e.g. 256) coupled to the exhaust catalyst. Such a means for heating the exhaust catalyst may be selected under conditions where such a heater is coupled to the exhaust catalyst (in other words, where the vehicle is equipped with such a heater) and may further be a function of one or more of onboard energy storage and fuel economy, amount of time between when exhaust catalyst temperature is predicted/modeled to drop below the light-off temperature and scheduled vehicle pickup time via a customer, etc. For example, the controller may in some examples select whether to raise the temperature of the exhaust via activation of the electric heater or via activation of the engine based on which method would have the least impact on fuel economy and onboard energy storage. In some examples, such a determination may be provided as instructions to the controller of the vehicle, via the software application (see FIGS. 5A-6), as will be elaborated below.

As discussed above, coordinating location and time of vehicle pickup may be via a software application stored on a computing device such as a computer, laptop, smartphone, tablet, etc. Accordingly, turning to FIGS. 5A-5B, such a software application will be described. At FIG. 5A, illustration 500 comprises a computing device 505. In this example illustration 500, computing device 505 may be understood to comprise a smartphone communicably coupled 507 (e.g. via wireless communication) with wireless network 131 and the internet. Computing device 505 may include a display 510, and any number of software applications 515 (depicted as rectangular boxes) for use in conjunction with computing device 505. Computing device 505 may store instructions in non-transitory memory 522. At FIG. 5A, the software application for coordinating vehicle pickup time for vehicles participating in car-sharing models, is depicted as software application 520. A customer may select software application 520, which may then be used to coordinate scheduling of a time and location for vehicle pickup. For example, a customer may select software application 520 by touching a finger to the icon for software application 520. In such an example, display 510 may be understood to comprise a touchscreen. In other examples (e.g. laptop, computer, etc.), a computer mouse may be used to select software application 520. In some examples, computing device 505 may include a camera 521.

Accordingly, turning to FIG. 5B, another illustration is depicted, showing further selection options 545 (depicted as circles) within the framework of software application 520. It may be understood that each selection option may result in a new screen being displayed on display screen 510, with further selection options. Without depicting each and every screen display and each and every selection option at each particular screen display, the general concepts of selection options 545 within the framework of software application 520 will be discussed below.

Selection option 550 may include information pertaining to make/model of vehicle the customer desires to pick up, and selection option 553 may include a desired pickup location. The software application 520 may be in electronic communication with any number of vehicles participating in the car-sharing model. Based on the desired pickup location, the software application may present to the user a number of different options for vehicle make/model. In some examples the desired pickup location may comprise a very specific pickup location, such as a particular street between two specific cross-streets, a physical address, a location identifiable via GPS coordinates, etc. In other examples, the desired pickup location may comprise a general vicinity, for example any vehicle within a particular radius of a specific location.

Selection option 556 may include options for selecting desired pickup time/date. For example, the vehicle customer may select to pick up the vehicle at 5:00 p.m. on Tuesday, July 15$^{th}$ of a particular year. In some examples the application 520 may enable a customer to save particular selection options so that they may regularly retrieve a vehicle without having to use the application to reserve a vehicle each and every time. For example, a customer may select to pick up a desired make/model of vehicle at a particular location every Tuesday morning at 7:00 a.m.

Selection option 559 may provide the customer with the ability to provide information to the application as to the desired destination. In the case of an autonomous vehicle, such information may enable the controller of the vehicle to navigate to the particular desired destination upon being picked up by the vehicle customer. In the case where the vehicle does not comprise an autonomous vehicle, but rather comprises a vehicle participating in the car-sharing model where the vehicle is driven by the customer, the desired destination may be utilized via the software application to coordinate future scheduling events for the particular vehicle. For example, if the vehicle is to be picked up at a particular time at a particular location and then driven to the desired destination, the software application may be able to infer approximate time that the vehicle is expected to arrive at the desired destination, thus enabling the coordination/scheduling of future pickup events. For example, the software application may in some examples communicate with the controller of the vehicle after the vehicle is picked up, to determine route traveled via the vehicle (e.g. based on GPS), current traffic information, etc. In one example, current traffic information may be obtained by the vehicle controller via V2V/V2I/V2I2V communications, and such information may be relayed to the software application 520. In another example, current traffic information may be obtained via the software application obtaining such information from one or more internet web sites, etc. In some examples, upon picking up the vehicle, the customer may use the vehicle instrument panel (e.g. 196) and/or onboard navigation system 132 to input a desired route to reach the desired destination, which may be communicated to the software application 520 in order to enable the software application to infer approximate time that the vehicle will reach its desired destination.

Selection option 562 may provide the customer with the ability to input the number of passengers for a particular vehicle pickup event in addition to the particular customer reserving the vehicle. For example, a particular customer may have a wife and two children, and may desire for the entire family to pick up a particular vehicle at a particular location and time/date in order to arrive at a particular destination. Such information may be utilized via the software application for scheduling purposes.

Selection option 565 may provide the customer with a means/method for payment. For example, at selection option 565, the customer may input one or more of credit card information, bank information, etc., in order to pay for the car-sharing service. Selection option 565 may include the ability to select dates for payments to post to the relevant account, options to save stored credit card/bank information for future transactions, etc.

Selection option 568 may provide access to/means for inputting information pertaining to the particular customer's account such as personal information (e.g. home address, full name, phone number, place of employment), user preferences, login/logout options, username options, etc.

Selection option 571 may include an option for the customer to choose an environmentally friendly mode of participating in the car-sharing model. Specifically, by choosing the environmentally friendly mode, the customer may agree to picking up vehicles for which the exhaust catalyst temperature is greater than the light-off temperature for that particular catalyst at the time of pickup whenever possible. In the event that no such vehicles are within a desired vicinity (e.g. desired pickup location, as discussed above), then the customer may be paired with a vehicle for which the exhaust catalyst temperature is below the light-off temperature. In some examples where the customer cannot be paired with a vehicle within the desired vicinity, the customer may be provided with an option of being paired with a vehicle outside of the desired vicinity (e.g. within another threshold radius of say, 0.25 miles or less, 0.5 miles or less, 1 mile or less, 1.5 miles or less outside of the desired vicinity, etc.) such that the vehicle paired with the customer for a particular pickup event comprises a vehicle for which exhaust catalyst temperature is above the light-off temperature at the time of scheduled pickup. In some examples, the environmentally friendly mode may comprise a default mode of operation of the software application.

Thus, it may be understood that a customer may utilize the software application depicted at FIGS. 5A-5B in order to schedule pickup of a particular vehicle at a desired location and time/date. The software application may in turn process requests from any number of customers, in order to fulfill the requests by pairing customers with vehicles available for pickup at the desired location and desired time/date. In processing the requests, the software application may further acquire information from the controllers of vehicles participating in the car-sharing model and determined to be at or within the vicinity of the desired location around the scheduled pickup time. Such information may include information related to exhaust catalyst temperature (e.g. when exhaust catalyst temperature is predicted to drop below light-off temperature), such that customers may be paired with vehicles for which exhaust catalyst temperature is above the light-off temperature at the time of vehicle pickup.

It may be understood that there may be instructions stored at the controller (e.g. 212) of vehicles participating in a car-sharing model as described above, where such instructions may include instructions to maintain exhaust catalyst temperature above light-off temperature provided that a vehicle pickup event is scheduled within a threshold amount of time from a key-off event. In other words, the software application described above with regard to FIGS. 5A-5B may send scheduling information to particular vehicles participating in the car-sharing model, which may be received at the controller of a particular vehicles, whereupon if the scheduled pickup time is within the threshold amount of time since a key-off event, exhaust catalyst temperature may be maintained above light-off temperature until the pickup event. The threshold amount of time may comprise 2 hours for example, however the threshold amount of time may be greater than 2 hours, or less than 2 hours, without departing from the scope of this disclosure. The threshold amount of time may comprise an amount of time where it may not be efficient for fuel economy and/or emissions reasons to maintain exhaust catalyst temperature above the light-off temperature, if the scheduled or otherwise inferred subsequent request for engine restart is greater than the threshold amount of time. In other words, if the scheduled pickup time (or otherwise inferred subsequent engine restart event) is greater than the threshold amount of time after a key-off event, there may not be a substantial benefit in terms of fuel economy and/or emissions to maintaining exhaust catalyst temperature above light-off temperature for the duration of the key-off event, as compared to a cold-start of the engine at the scheduled pickup time.

The software application depicted at FIGS. 5A-5B may in some examples be updated based on information received from one or more customers. As one example, a customer may have scheduled a vehicle pickup for a particular time, and thus a particular vehicle scheduled to be picked up may be in the process of maintaining exhaust catalyst temperature above the light-off temperature. However, the customer may submit a request during such time, of a desire to pick the vehicle up at a later time. In such an example, the software application may query a plurality of schedules for a plurality of vehicles, in order to determine if there is a possibility or likelihood that another vehicle will be available at the later time, where it makes more sense from a fuel economy and emissions standpoint to pair the customer with the other vehicle. For example, the other vehicle may be scheduled to arrive at the pickup location within five minutes of the later scheduled pickup time. In such an example, it may be more fuel efficient and/or better for emissions for the software application to send instructions to the controller of the initial vehicle, instructing it to discontinue the exhaust catalyst heating operation and let the temperature of the exhaust catalyst decay to ambient temperature. The software application may then coordinate with the customer to pair the customer with the vehicle arriving at the later time. In this way, the customer may be paired with a vehicle for which an exhaust catalyst temperature raising operation does not have to be conducted. Further, by aborting the exhaust catalyst temperature raising operation for the initial vehicle, fuel economy may be improved as opposed to maintaining the temperature of the exhaust catalyst above the light-off temperature until the initially scheduled pickup.

Said another way, the software application, in an effort to minimize impact to fuel economy, maximize reduction in undesired emissions, and satisfy customer requests, may in some examples instruct a controller of a vehicle to discontinue a routine for maintaining exhaust catalyst temperature above light-off temperature. In another example, in response to a scheduling change request from a customer, the software application may update a scheduled pickup time for a particular vehicle to a later time (or an earlier time) and send such updated information to the vehicle controller of the particular vehicle scheduled for pickup. The controller of the vehicle may then adapt parameters of the exhaust catalyst temperature raising operation in order to comply with the updated information received from the software application. For example, in a situation where the customer requests a later pickup time than initially requested, the controller may activate the engine for a longer period of time when appropriate, to raise temperature of the exhaust catalyst to a higher level than initially determined. In some examples, the software application itself may provide instructions to the controller as to how long to activate the engine (or electric heater). In this way, the temperature of the exhaust catalyst may be maintained above the light-off temperature until the later pickup time, while also minimizing number of exhaust catalyst heating operations until the later pickup time. In still another example where the customer requests an earlier pickup time, the engine may be activated for a shorter period of time when appropriate (for example under instructions at the controller of the vehicle or via instructions received from the software application at the controller of the vehicle), to raise temperature of the exhaust catalyst to a lower level than initially determined. In this way, the temperature of the exhaust catalyst may be maintained above the light-off temperature until the earlier pickup time, without activating the engine (or electric heater) for longer periods of time than necessary. In yet another example where the customer requests an earlier pickup time, it may be determined that no exhaust catalyst temperature raising operation may be performed, as per the earlier pickup time, it is predicted that the exhaust catalyst temperature is not expected to drop below the light-off temperature by the time the vehicle is picked up.

Turning now to FIG. 6, an example methodology 600 for operational aspects of the software application depicted at FIGS. 5A-5B, is shown. It may be understood that method 600 may be stored as executable instructions in non-transitory memory of the particular computational device (e.g. laptop, smartphone, etc.) running the software application.

At step 605, method 600 may include receiving a request for a vehicle pickup from a user, or customer. Specifically, the customer may input information into the software application that comprises information related to desired pickup location, desired time, desired date, requested make/model of the vehicle, etc. Once such a request has been received via the software application, method 600 may proceed to 610. At 610, method 600 may include the software application querying a stored schedule of vehicles in a fleet of vehicles comprising the car-sharing model. As discussed above at FIGS. 5A-5B, information input into the software application may include desired destination for particular vehicles, desired time of arrival at particular locations for particular vehicles, etc. Thus, by querying the stored scheduling information, it may be possible to determine which of one or more vehicles may be available to satisfy the request of the customer. In some examples, it may be understood that the request may be received a significant time prior (e.g. one day or more, two days or more, three days or more, etc.). In such an example, it may not be possible to precisely predict whether a particular vehicle will be available at the requested time and location, but it may be determined whether it may be likely that such a vehicle may be available based on information related to scheduling of the vehicles in the fleet.

Proceeding to 615, method 600 may include scheduling placeholder(s) for one or more vehicles that, based on the querying of the schedule information, are likely or are predicted to be able to satisfy the request of the customer. In other words, the current schedule for coordinating vehicle pickup/dropoff may be updated to include the newly received information from the customer. For example, certain vehicles in the fleet may be excluded from being options for satisfying the request of the customer, whereas other vehicles may be included as options for satisfying the request of the customer. In some examples, customer drive habits may be learned over time and provided to the software application, which may aid in predicting whether particular vehicles may be an option for satisfying a particular request of the customer. For the vehicles that are included as options for satisfying the request of the customer, there may be various priority values assigned to such vehicles. For example, certain vehicles may be assigned to a high-priority group, where such a group comprises vehicles highly likely to be able to satisfy the request of the customer based on the current scheduling information. Other vehicles may be assigned to a medium-priority group, where such a group comprises vehicles less likely than those vehicles in the high-priority group to be able to satisfy the request of the customer based on the current scheduling information. Still other vehicles may be assigned to a low-priority group, where such a group comprises vehicles even less likely than those in the medium-priority group to be able to satisfy the request of the customer, based on the current scheduling information.

Continuing to 620, responsive to an indication that the request from the customer is likely to be able to be satisfied, the software application may provide confirmation to the customer that the customer may expect to pick up a vehicle at the desired time/date and location. The confirmation may be provided via one or more of the software application itself, a text message to the customer's phone, an email, etc. However, depending on how far in advance of the date/time the request is received, the confirmation at 620 may not include a specific pickup location. For example, if the vehicle does not comprise an autonomous vehicle, but rather a vehicle that is picked up and driven by a customer, then the specific location for pickup may not be precisely known until near the time that the vehicle is requested. Alternatively, in the case of an autonomous vehicle, it may be understood that a more precise location may be arranged ahead of time, because of the ability of the vehicle to autonomously travel to the requested location.

Proceeding to 625, the software application may regularly receive status updates from the one or more vehicles for which the placeholders have been sent. The status updates may include information related to vehicle whereabouts (e.g. GPS coordinates communicated via the controller(s) of the one or more vehicles), current traffic information along routes for which the one or more vehicles are traveling, any scheduling updates for the particular one or more vehicles (e.g. a notification that another customer has requested a particular vehicle for a longer period of time than initially requested, etc.), information pertaining to whether the vehicle has had an issue that involves the vehicle being out of commission for servicing reasons, etc.

The status updates of the one or more vehicles may further include information pertaining to exhaust catalyst temperature, expected/predicted rate of exhaust temperature decay, expected/predicted time when exhaust catalyst temperature may drop below a light-off temperature, etc. Such information may in some examples include information pertaining to drive cycle aggressiveness for a drive cycle prior to a vehicle being potentially picked up by a customer, for example. Accordingly, proceeding to 630, method 600 may include coordinating environmentally friendly pickup via communication with the one or more vehicles. For example, there may be a situation where three vehicles satisfy the desires of a particular customer in terms of pickup time and location, make/model, etc. The software application may coordinate, between the three vehicles, which vehicle to pair with the customer in order to achieve the most environmentally friendly pickup event. Specifically, the vehicle for pickup may be selected as the vehicle for which an amount of time that the engine has to be activated or the electric heater coupled to the exhaust catalyst has to be activated to maintain exhaust catalyst temperature above light-off temperature is minimized, in terms of the three vehicles. This may be coordinated with future pickup scheduling of other customers, such that overall fuel economy and emissions may be reduced for the entire fleet of vehicles participating in the ride-sharing program.

Proceeding to 635, status updates may be periodically provided to the customer, until the precise vehicle for pickup is finalized. If the precise vehicle for pickup is not yet finalized, at 640 method 600 may return to 625, where status updates may continue to be retrieved from the one or more vehicles, such that environmentally friendly pickup may be coordinated with the customer.

In response to the pickup status being finalized at 640, in other words, in response to the customer being paired with a specific vehicle, the customer may be provided a means for identifying and accessing the specific vehicle at 645. For example, a license plate may be provided to the customer, an address in close proximity to the vehicle may be provided, etc. In some examples, the software application may include means such as a map that may be used by the customer to precisely locate the vehicle. The map may be generated via geomapping services, for example.

At 645, means for unlocking the vehicle may comprise the software application querying the customer to scan a quick response (QR) code, bar code or other identifier associated with the vehicle to be picked up. For example, using a camera of the computing device such as a mobile phone, the customer may scan a barcode or QR code placed on the vehicle. The software application may then transmit the QR code or barcode to remote servers to verify the customer has reserved the particular vehicle. If confirmed, then a confirmation may appear on the computing device, and the remote servers may command the vehicle, via communication with the controller over the wireless network, to unlock the vehicle. The customer may then enter the vehicle, and use keys found within to drive the vehicle. Alternatively, in the case of an autonomous vehicle, the vehicle may not include keys.

In another example, the controller of the particular vehicle may have a radio frequency identification (RFID) reader that can detect the computing device and send the computing device's ID to remote servers, which can then in turn confirm the pickup and unlock the doors.

It may be understood that, via the use of software application methodology depicted at FIG. 6, at the time of pickup the exhaust catalyst of the particular vehicle may be above the light-off temperature, such that the ensuing engine-start request occurs with reduced emissions. Alternatively, in some examples where it is not advantageous in terms of fuel economy and/or emissions to maintain exhaust catalyst temperature above light-off temperature until the time of pickup, then the next ensuing engine-start may comprise a cold-start event. However, by coordinating environmentally friendly pickup events whenever possible, overall emissions related to cold-start events for vehicles participating in car-sharing models may be reduced.

Thus, the systems described above may enable a system for a vehicle participating in a car-sharing model. Such a system may comprise an exhaust catalyst positioned in an exhaust of an engine of the vehicle and a temperature sensor coupled to the exhaust catalyst for monitoring temperature of the exhaust catalyst, and a controller with computer readable instructions stored on non-transitory memory. When executed, the instructions may cause the controller to, in response to an engine-off event, obtain a plurality of measurements pertaining to a temperature of the exhaust catalyst in order to infer a time, during the engine-off event, that the temperature of the exhaust catalyst is likely to drop below a threshold temperature. The controller may store further instructions to, via a software application that communicates wirelessly with the controller, receive a scheduled pickup time of the vehicle based on a request from a customer using a software application. In response to the scheduled pickup time being within a threshold duration from the engine-off event, and further in response to the scheduled pickup time being after the time that the temperature of the exhaust catalyst is likely to drop below the threshold temperature, the controller may store instructions to actively raise the temperature of the exhaust catalyst in order to maintain the temperature of the exhaust catalyst above the threshold temperature until the scheduled pickup time of the vehicle.

In one example of the system, the controller may store further instructions to activate the engine to combust air and fuel in order to actively raise the temperature of the exhaust catalyst. In another example, the system may further comprise an electric heater coupled to the exhaust catalyst, wherein the controller may store further instructions to select whether to utilize the engine in order to actively raise the temperature of the exhaust catalyst, or to use the electric heater to actively raise the temperature of the exhaust catalyst.

In such a system, the controller may store further instructions to actively raise the temperature to a predetermined level, the predetermined level a function of a time difference between the time that the temperature of the exhaust catalyst is likely to drop below the threshold temperature and the scheduled pickup time.

Turning now to FIG. 7A, a method 700 is shown for determining, at a key-off event, an expected time when exhaust catalyst temperature will decay to below light-off temperature. More specifically, as discussed above with regard to FIG. 4A, a series of sleep/wake cycles of the controller may be conducted, where during the wake cycles the controller retrieves information related to exhaust catalyst temperature. From such data, temperature decay of the exhaust catalyst may be modeled in order to predict at what time the temperature of the exhaust catalyst is expected to drop below the light-off temperature.

Method 700 will be described with reference to the systems described herein and shown in FIGS. 1-3, though it should be understood that similar methods may be applied to other systems without departing from the scope of this disclosure. Method 700 may be carried out by a controller, such as controller 212 in FIG. 2, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIGS. 1-3. The controller may employ actuators such as fuel injectors (e.g. 266), electric heater actuator (e.g. 256a), etc., to alter states of devices in the physical world according to the methods depicted below.

Method 700 begins at 705, and includes and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 710, method 700 may include indicating whether a vehicle-off condition that includes an engine-off condition, is detected via the controller. If such a condition is not indicated, method 700 may proceed to 715. At 715, method 700 may include maintaining current vehicle operating conditions. For example, if the engine is combusting air and fuel, such operation may be maintained. Method 700 may then end.

Returning to 710, in response to a vehicle-off condition being indicated where the engine is shut down or deactivated, method 700 may proceed to 720. At 720, method 700 may record temperature of the exhaust catalyst. For example, the exhaust catalyst temperature sensor (e.g. 258) may communicate exhaust catalyst temperature to the controller (e.g. 212). This initial recording of exhaust catalyst temperature may be understood to be conducted prior to sleeping the controller, and the reading may be stored at the controller. Accordingly, responsive to the exhaust catalyst temperature having been recorded at 720, method 700 may proceed to 725, and may include sleeping the controller for a predetermined amount of time. The predetermined amount of time may comprise 3 minutes, 5 minutes, etc. A timer may be set by the controller, such that the controller may be woken after the predetermined amount of time elapses.

Accordingly, proceeding to 730, method 700 may include waking the controller in response to the predetermined amount of time elapsing. With the controller awake, method 700 may proceed to 735, where exhaust catalyst temperature is again recorded as above at 720, and the reading is stored at the controller. Proceeding to 740, method 700 may include indicating whether the number of exhaust catalyst temperature recordings is equal to a predetermined threshold number (e.g. 5 recordings). If not, then method 700 may return to 725, where the controller may again be slept for the predetermined amount of time, prior to being woken in order to retrieve further temperature recordings at 735.

Responsive to the threshold number of exhaust catalyst temperature recordings having been retrieved at 740, method 700 may proceed to 745. It may be understood that in the case of a S/S event, the controller may not proceed through the same sleep/wake cycles, as the controller may be maintained awake for a duration of a S/S event. At 745, method 700 may include extrapolating the expected time at which exhaust catalyst will drop to below a threshold temperature, the threshold temperature comprising light-off temperature, for example. As discussed above with regard to FIG. 4A, the exhaust catalyst temperature decay readings may allow for regression of the measurements into an exponential decay formula using least squares fitting, as an example. In this way the exponential temperature decay may be modeled based on empirically recorded measurements so as to reliably predict when exhaust catalyst temperature will drop below light-off temperature. Furthermore, while not explicitly shown, the model may be further refined based on, for example, current and forecasted weather conditions retrieved via the controller from one or more servers, as discussed above with regard to FIG. 4A.

Proceeding to 750, method 700 may include the controller communicating via wireless communication, for example, with the software application discussed above (e.g. 520) with regard to FIGS. 5A-5B and FIG. 6. The controller may communicate the information related to expected time at which exhaust catalyst temperature is predicted to drop below light-off temperature, determined at 745.

Proceeding to FIG. 7B, method 700 continues at 755. At 755, method 700 may include retrieving information from the software application pertaining to whether and how to conduct an exhaust catalyst heating operation. More specifically, as discussed above with regard to method 600, the software application may select particular vehicles for pickup based on at least time and location desired for pickup, desired make/model, and further based on the exhaust catalyst being above light-off temperature at the time of pickup whenever possible. Thus, with knowledge of when the exhaust catalyst temperature is predicted to drop below the light-off temperature for the vehicle that recently was deactivated, the software application may determine whether that particular vehicle may be scheduled for pickup via a customer that has requested such pickup, and if so, whether it is economical from a fuel efficiency standpoint and emissions standpoint to maintain that particular vehicle's exhaust catalyst above light-off temperature until the scheduled pickup. Thus, as discussed, at 755, method 700 may retrieve information from the software application regarding whether an exhaust catalyst heating operation is requested to be conducted. In some examples, the requested time of pickup (or other inferred subsequent engine restart request) may be prior to the time at which exhaust catalyst temperature is predicted/expected to drop below light-off temperature. In such a case, it may be understood that the exhaust catalyst heating operation may not be scheduled. In another example, the requested time of pickup (or other inferred subsequent engine restart request) may be greater than a threshold amount of time since the vehicle-off event. As discussed above, the threshold amount of time may comprise 2 hours, for example. In such an example where the requested pickup time (or other inferred subsequent engine restart request) for the vehicle is greater than the threshold amount of time, then no exhaust catalyst heating operation may be scheduled, and it may be understood that the next engine restart request where the engine is activated to combust air and fuel may comprise a cold-start event. In such an example, it may be understood that the fuel economic benefit and/or emissions benefit to maintaining exhaust catalyst temperature above light-off temperature until the requested time of pickup may not be significant enough to justify the exhaust catalyst heating operations, as opposed to a single engine cold-start event at the next requested vehicle pickup time.

However, in other examples, the requested pickup time (or other inferred subsequent engine restart request) for a particular customer may be less than the threshold amount of time since the key-off event, but after the time at which exhaust catalyst temperature is expected/predicted to drop below light-off temperature. Accordingly, in such an example, the software application may communicate with the controller of the vehicle to request the exhaust catalyst heating operation be conducted.

As discussed with regard to FIGS. 4B-4C, the amount of time which the exhaust catalyst heating operation is conducted, and thus the threshold temperature to which the exhaust catalyst is raised during the exhaust catalyst heating operation may be a function of how long after the exhaust catalyst temperature is predicted to drop below light-off temperature, that the pickup of the vehicle (or other inferred subsequent engine restart request) is requested. The amount of time which the exhaust catalyst heating operation is conducted and thus the threshold temperature to which the exhaust catalyst is raised during the exhaust catalyst heating operation may further be a function of the decay rate of the exhaust catalyst temperature, determined at 745. For example, the decay rate at 745 may approximate the decay rate which may result after conducting the exhaust catalyst heating operation. However, it may be understood that such correlation may only be approximate. For example, because heat rejection from the engine may be quite different after a vehicle has completed a drive cycle, as compared to after an exhaust catalyst heating operation has been conducted, the decay rate may be different. However, the decay rate at the initial vehicle-off event determined at 745 may at least provide an approximation of exhaust catalyst decay rate which may be used in order to determine what temperature to raise the exhaust catalyst temperature to, as a function of when the customer requests vehicle pickup after the exhaust catalyst temperature is predicted to drop below light-off temperature. In other words, the decay rate of exhaust catalyst temperature may be faster after conducting an exhaust catalyst heating operation, due to less overall heat rejection from the engine as opposed to heat rejection from the engine after a drive cycle. Thus, in some examples, the software application may compensate for this difference by assuming or taking into account the fact that the decay rate may be faster after the exhaust catalyst heating operation is conducted, compared to the initial decay rate. In this way, the threshold temperature that the exhaust catalyst is raised to during the exhaust catalyst heating operation may be sufficient to ensure that the temperature of the exhaust catalyst is not again at risk of dropping below the light-off temperature prior to the scheduled pickup.

Thus, the software application may determine how long after the exhaust catalyst temperature is predicted to drop below the light-off temperature that the vehicle pickup is requested, and may thus request the exhaust catalyst heating operation to be conducted such that a threshold temperature is reached during the exhaust catalyst heating operation, the threshold temperature determined as discussed above. In other examples, such instructions may additionally or alternatively be stored at the controller of the vehicle. It may be understood that the shorter after the exhaust catalyst temperature is predicted to drop below light-off temperature that the vehicle is requested to be picked up (or other inferred subsequent engine restart request), the lower the predetermined threshold temperature that the exhaust catalyst is requested to be raised to will be. Alternatively, the longer after the exhaust catalyst temperature is predicted to drop below light-off temperature that the vehicle is requested to be picked up (or other inferred subsequent engine restart request), the greater the threshold temperature will be. As discussed above with regard to FIGS. 4B-4C, the predetermined threshold temperature that the exhaust catalyst is raised to may be further selected such that the exhaust catalyst temperature is within a threshold number of degrees from the light-off temperature at the time of pickup of the vehicle (or other inferred subsequent engine restart request) by the customer.

Thus, at 755, the software application may provide information as to the predetermined threshold temperature to raise the exhaust catalyst to during an exhaust catalyst heating operation, provided that an exhaust catalyst heating operation is requested based on when the vehicle is requested to be picked up and when the exhaust catalyst temperature is predicted to drop below light-off temperature. As discussed, alternatively, such instructions may be stored at the controller of the vehicle, so that in response to a scheduled pickup time or otherwise inferred subsequent engine restart request, the vehicle controller may determine the predetermined threshold temperature to raise the exhaust catalyst to.

Furthermore, at 755 the software application may additionally provide the controller with instructions pertaining to whether to utilize the electric heater (e.g. 256) in order to conduct the exhaust catalyst heating operation, or whether to use the engine by activating the engine to combust air and fuel. Alternatively, such instructions for making such a determination may be stored at the controller. The determination may be a function of the threshold temperature that the software application has requested the exhaust catalyst be raised to, and may further be a function of one or more of onboard energy storage level, fuel level, and fuel economy penalty for each of activating the engine or using the electric heater. For example, if onboard energy storage level is below a threshold where using the onboard energy storage device to supply power to the electric heater may adversely impact downstream operations that rely on the onboard energy storage device, then the engine may be selected to be used for the exhaust catalyst heating operation. If the fuel economy penalty for raising exhaust catalyst temperature to the threshold temperature is greater for using the electric heater as compared to the engine, then the engine may be selected. Alternatively, if the fuel economy penalty for raising exhaust catalyst temperature to the threshold temperature is less when using the electric heater as compared to the engine, then the electric heater may be selected. In examples where the vehicle is not equipped with an electric heater for raising exhaust catalyst temperature, then the engine may be selected. Examples where the electric heater may be selected as compared to the engine may include situations where only a small amount of heat is requested to be added to the exhaust catalyst prior to pickup of the vehicle. In such a case, it may be more energetically efficient to simply activate the electric heater, rather than activating the engine to combust air and fuel, which may be less efficient than simply activating the electric heater.

Proceeding to 760, method 700 may include sleeping the controller (except in the case of a S/S event). A timer may be set such that the controller may be woken at a specified time in order to conduct the exhaust catalyst heating operation. In the case of a S/S event, the timer may be set in order to trigger the exhaust catalyst heating operation, but the controller may be maintained awake. The specified time may comprise a time within 1 minute or less of when exhaust catalyst temperature is predicted to drop below light-off temperature. In other examples, the specified time may comprise 2 minutes or less, 3 minutes or less, etc.

Proceeding to 765, if an exhaust catalyst heating operation has not been requested at 755, then method 700 may end. Alternatively, if an exhaust catalyst heating operation has been requested, then at 770 if the timer has not expired, the controller may be maintained asleep (or awake in the case of a S/S event) until the timer expires. Responsive to the timer expiring at 770, method 700 may proceed to 775. At 775, method 700 may include waking the controller from the sleep mode (where applicable). At 780, method 700 may include conducting the exhaust catalyst heating operation.

In the case that the request to conduct the exhaust catalyst heating operation includes activating the electric heater, the following methodology may be employed at 780. Specifically, the controller may send a signal to the actuator (e.g. 256a) of the electric heater, actuating the electric heater to raise temperature of the exhaust catalyst via energy provided via the onboard energy storage device (e.g. 150). Alternatively, if the request to conduct the exhaust catalyst heating operation includes activating the engine to combust air and fuel, then the engine may be activated with any number of cylinders fueled. For example, the maximum number of cylinders available may be fueled, or less than the maximum number of cylinders available may be fueled. Furthermore, sparking timing may be controlled to be retarded such that the raising of the temperature of the exhaust catalyst may proceed as rapidly as possible.

Whether the exhaust catalyst heating operation is conducted by activating the electric heater, or by activating the engine to combust air and fuel, method 700 may proceed to 785 where exhaust catalyst temperature may be monitored, for example via the exhaust catalyst temperature sensor (e.g. 258). Continuing to 788, method 700 may include indicating whether exhaust catalyst temperature has reached the predetermined threshold temperature, specified at 755 of method 700. If not, then method 700 may return to 780 where the heating operation may continue as discussed. Alternatively, responsive to the exhaust catalyst temperature having reached the threshold temperature, method 700 may proceed to 790. At 790, method 700 may include stopping the conducting of the exhaust catalyst heating operation. Specifically, if the electric heater was employed to conduct the heating operation, the controller may send a signal to the actuator of the electric heater, actuating the electric heater off. If the engine was activated to combust air and fuel, then the controller may control the engine to stop the injection of fuel to the activated cylinder(s), and spark provided to the activated cylinder(s) may be discontinued.

Responsive to the heating operation having been concluded at 790, method 700 may proceed to 793. At 793, method 700 may include returning to step 720 at FIG. 7A. In doing so, the same procedure as that conducted after the vehicle was initially deactivated may again be conducted in order to ascertain whether, based on empirically determined measurements, the exhaust catalyst is predicted to remain above the light-off temperature until the time of the requested pickup event. More specifically, as discussed above, the threshold temperature that the exhaust catalyst is raised to during the exhaust catalyst heating operation is set in order to ensure that the exhaust catalyst temperature is above the light-off temperature by the time the vehicle is picked up. However, as additionally discussed, there may be factors such as changes in weather conditions, differences in heat rejection from the engine for the first initial decay as compared to after the exhaust catalyst heating operation was conducted, etc., that may result in actual temperature decay being different than expected. In such a case, by again modeling exhaust catalyst temperature decay rate based on empirically determined measurements, it may be determined if actual exhaust catalyst temperature may in fact be predicted to again drop below light-off temperature prior to the vehicle being picked up by the customer (or other inferred subsequent engine restart request). In such a case, the exhaust catalyst heating operation may be again conducted prior to the vehicle being picked up, in order to maintain exhaust catalyst temperature above light off temperature at the time the vehicle is picked up by the customer.

While not explicitly illustrated in FIGS. 7A-7B, it may be understood that the method is aborted in response to the vehicle being picked up as requested by the customer, or in response to another engine start request (for example in the case of a S/S event). Thus, at any point during the conducting of the method 700, the vehicle is picked up by the customer, then method 700 may be aborted.

Thus, it may be understood from the above discussion that there are several opportunities for conducting the exhaust catalyst heating operation to maintain temperature of the exhaust catalyst above light-off temperature at the time of the next engine restart request. One example includes scheduled vehicle pickup events, where the vehicle pickup is coordinated via a software application such that the exhaust catalyst temperature may be maintained above light-off temperature until the engine restart request associated with the vehicle being picked up. Another example includes learned stop events based on particular learned customer drive habits. For example, particular drive habits for a customer participating in a car-sharing program may be learned over time, and thus a vehicle controller may infer how long a particular stop where the engine is deactivated may last. In this way, the subsequent engine restart request time may be inferred based on this learned information, such that the exhaust catalyst may be maintained above light-off temperature until the subsequent engine restart request is received. Still another example includes S/S events, where the engine is deactivated for example, at a traffic light, train crossing, etc. For particular S/S events, there may be circumstances where exhaust catalyst temperature may drop to below light-off temperature prior to an engine restart request. The time of the engine restart request in such circumstances may be inferred based on wireless communication with the controller of the vehicle and one or more infrastructures and/or servers, for example via V2I2V communications with relevant traffic infrastructure interfaces. For example, the controller of the vehicle may determine that a particular stop may last 10 minutes, if the particular stop is based on a train crossing. If it is also determined, using the methodology discussed herein, that exhaust catalyst temperature is predicted to drop below light-off temperature before the inferred subsequent engine restart request, then exhaust catalyst temperature may actively be maintained above light-off temperature until the subsequent engine restart request is received at the controller.

Thus, the methods described above may enable a method comprising while a a vehicle is stationary with an engine not combusting air and fuel, actively raising a temperature of an exhaust catalyst positioned in an exhaust system of the engine to maintain the temperature of the exhaust catalyst above a threshold temperature until a subsequent request for engine torque to propel the vehicle is requested. In one example, the conditions where the vehicle is stationary with the engine not combusting air and fuel further comprises the vehicle being unoccupied. The vehicle may be one of a plurality of vehicles participating in a car-sharing model, where the subsequent request for engine torque to propel the vehicle is related to a scheduled pickup time of the vehicle by a customer.

In another example, the conditions where the vehicle is stationary with the engine not combusting air and fuel may include a start/stop event where the engine is deactivated and where the vehicle is occupied.

In such a method, actively raising the temperature of the exhaust catalyst may include activating the engine to combust air and fuel. However, in another example, actively raising the temperature of the exhaust catalyst may include activating an electric heater coupled to the exhaust catalyst.

Such a method may further comprise actively raising the temperature of the exhaust catalyst to maintain the temperature of the exhaust catalyst above the threshold temperature under conditions where it is inferred that the subsequent request for engine torque to propel the vehicle is within a threshold duration of time from the time the engine was commanded to stop combusting air and fuel.

Such a method may further comprise actively raising the temperature of the exhaust catalyst positioned in the exhaust system when the temperature of the exhaust catalyst is predicted to be within a threshold number of degrees of the threshold temperature. The method may further comprise obtaining a plurality of measurements corresponding to the temperature of the exhaust catalyst while the vehicle is stationary with the engine not combusting air and fuel, and regressing the plurality of measurements into an exponential decay formula in order to predict when the temperature of the exhaust catalyst will be within the threshold number of degrees of the threshold temperature.

Another example of a method may comprise at an engine-off event for a vehicle, via a controller, obtaining a series of temperatures of an exhaust catalyst and extrapolating a predicted time after the engine-off event that the temperature of the exhaust catalyst is expected to drop below a threshold temperature. Responsive to a scheduled subsequent request for engine torque to propel the vehicle being after the predicted time and within a threshold duration of the engine-off event, the method may include actively raising the temperature of the exhaust catalyst to maintain the temperature above the threshold temperature at the time of the scheduled subsequent request. The vehicle may be participating in a car-sharing model. The scheduled subsequent request for engine torque to propel the vehicle may be related to a scheduled pickup time of the vehicle via a customer, where the scheduled pickup time is received via the controller of the vehicle via wireless communication between the controller and a software application that coordinates pickup times and locations of the vehicle in response to requests from customers.

In such a method, an amount that the temperature is actively raised to may be variable depending on a relationship between the predicted time after the engine-off event that the temperature is expected to drop below the threshold temperature and the scheduled subsequent request for engine torque. For example, the amount that the temperature is actively raised to may be increased when a difference between the predicted time and the scheduled subsequent request increases. Alternatively, the amount that the temperature is actively raised to may be decreased when the difference between the predicted time and the scheduled subsequent request decreases.

In such a method, obtaining the series of temperatures of the exhaust catalyst may further comprise obtaining a temperature measurement of the exhaust catalyst while the controller is awake and then sleeping the controller for a predetermined time before waking the controller to obtain another temperature measurement pertaining to the temperature of the exhaust catalyst. The series of temperatures may comprise a predetermined number of temperature measurements for extrapolating the predicted time after the engine-off event that the temperature of the exhaust catalyst is expected to drop below the threshold temperature.

In such a method, actively raising the temperature of the exhaust catalyst may include one of activating the engine to combust air and fuel, or activating an electric heater coupled to the exhaust catalyst. The temperature of the exhaust catalyst may be raised via activating the engine or via activating the electric heater. Selecting whether to raise the temperature via activating the engine or via activating the electric heater may be based on which method of actively raising the temperature of the exhaust catalyst is more beneficial in terms of fuel economy and emissions.

Turning now to FIG. 8, an example timeline 800 is shown, depicting the conducting of an exhaust catalyst heating operation for a vehicle that is scheduled to be picked up at a certain time and location, the time and location scheduled via a customer using a software application on a mobile computing device, such as the software application described above with regard to FIGS. 5A-6. Timeline 800 includes plot 805 depicting engine status, where engine status is on or off, over time. Timeline 800 further includes plot 810, depicting a status of the electric heater (e.g. 256), coupled to the exhaust catalyst (e.g. 270), over time, where the electric heater may either be on and providing heat to the exhaust catalyst, or off. Timeline 800 further includes arrow 815, indicating a scheduled pickup time for the vehicle which has been arranged by the customer as discussed above. Timeline 800 further includes plot 820, indicating an actual exhaust catalyst temperature, as indicated for example, by the exhaust catalyst temperature sensor (e.g. 258). Timeline 800 further includes plot 830, indicating a status of the vehicle controller (e.g. 212). The controller may either be awake or asleep, over time. Timeline 800 further includes plot 835, indicating whether the vehicle has been accessed via a customer (yes) or not (no), over time.

At time t0, the engine is on (plot 805), and thus it may be understood that the engine is combusting air and fuel. The vehicle has been accessed by a first customer (plot 835), and the controller is awake (plot 830), thus it may be understood that the vehicle is in operation with a customer in the vehicle and that the vehicle being driven to a desired location. In this example timeline, while not explicitly illustrated, it may be understood that the vehicle comprises an autonomous vehicle where the vehicle is driven autonomously, but in other examples the vehicle may comprise a vehicle that is driven by the particular customer, without departing from the scope of this disclosure. The electric heater is off (plot 810), and catalyst temperature (plot 820) is above a light-off temperature, the light off temperature represented by dashed line 823. A second customer has requested, via the software application, a pickup time (and location) represented by arrow 815.

Between time t0 and t1, the vehicle drives the first customer to the desired location. At time t1, the desired destination is reached, and the engine is deactivated (plot 805). While not specifically illustrated, it may be understood that the engine-off status represents a vehicle-off condition. At the time that the engine is deactivated, the controller is kept awake to record an initial measurement of exhaust catalyst temperature, represented as an open circle at time t1. Measurements of exhaust catalyst temperature are thus represented by open circles and are referenced by numeral 826.

Shortly after the engine is deactivated at time t1, the first customer exits the vehicle (plot 835). Between time t1 and t2, the controller proceeds through a series of wake/sleep cycles, where each time the controller is awoken, exhaust catalyst temperature is recorded (open circles 826), and the measurements are stored at the controller. The time period for which the controller is slept in between wake cycles may comprise 5 minutes, 3 minutes, 2 minutes, etc. In this example timeline, it may be understood that the time period comprises 5 minutes. By obtaining the empirical measurements of exhaust catalyst temperature between time t1 and t2, the controller models the exponential decay profile of the exhaust catalyst temperature. A first modeled temperature decay is thus represented by dashed line 821. In this way, the controller determines when it is predicted that the exhaust catalyst temperature will drop below the light-off temperature, light-off temperature referenced by dashed line 823. In this example timeline, it is predicted via the model that exhaust catalyst temperature will drop below the light-off temperature just after time t3, as illustrated.

By obtaining an indication of when exhaust catalyst temperature for the particular vehicle is predicted to drop below light-off temperature, the indication may be communicated to the software application, in order to coordinate an environmentally friendly vehicle pickup event where the vehicle is picked up at a time when exhaust catalyst temperature is above light-off temperature. In this example timeline, it may be understood that the software application determines that the optimal pairing in terms of fuel economy and emissions reduction is the pairing of the second customer with the vehicle depicted at timeline 800. Specifically, the software application determines that it is economical from a fuel efficiency standpoint and from an emissions standpoint to keep the exhaust catalyst above light-off temperature for the vehicle, in order to have the exhaust catalyst above light-off temperature at the time of the scheduled pickup. It may be understood that there may be other options for vehicle pickup by the second customer, however the other options may not be ideal from a fuel economy and emissions standpoint. For example, one of the other options may be a vehicle for which a cold start of the engine would have to be conducted at the scheduled pickup time, for example a vehicle that was turned-off greater than a threshold duration prior to the scheduled pickup time (e.g. greater than 2 hours prior). By pairing the second customer with the vehicle depicted at timeline 800, for which the exhaust catalyst temperature may be maintained above light-off temperature until the scheduled pickup, release of undesired emissions to the environment may be reduced, and fuel economy improved. In situations where a particular customer cannot be paired with a vehicle for which exhaust catalyst temperature is above light-off temperature at the time requested, then the customer may be paired with a vehicle for which exhaust catalyst temperature is below light-off temperature at the time of pickup. Thus, it may be understood that the software application may take into account all information related to status of vehicles participating the car-sharing model, and the schedule pertaining to desired pickup location and time, in order to coordinate environmentally friendly pickup of vehicles when possible. In this way, for the entire fleet of vehicles participating in the car-sharing model, overall emissions related to cold-start emissions may be reduced, and overall fuel economy improved.

Furthermore, the software application may retrieve other relevant parameters from the vehicle controller, such as status or charge level of the onboard energy storage device, fuel level, an inferred amount of heat rejection from the engine (which may be based on mass air flow for the previous drive cycle summed over time), etc. The software application may further acquire information from one or more servers related to current and future weather conditions. Based on the first modeled temperature decay (plot 821), the requested pickup time (plot 815), and the further information retrieved from the controller and from one or more servers related to weather conditions, the software application may determine how the exhaust catalyst heating operation may be conducted. More specifically, in this example timeline, the software application determines that it is most advantageous from a fuel economy and emissions standpoint, to use the engine in order to raise exhaust catalyst temperature at the time when the exhaust catalyst temperature is predicted to drop below the light-off temperature. Furthermore, based on the first modeled temperature decay (plot 821), the requested time of pickup, and the further information retrieved from the controller and the one or more servers related to weather conditions, the software application may determine a first threshold temperature to raise the exhaust catalyst to. The first threshold temperature in this example timeline 800 is thus represented by dashed line 824. It may be understood that the first threshold temperature 824 may be selected in order to 1) maintain exhaust temperature above the light-off temperature by the time of the next scheduled pickup event without having to conduct another exhaust catalyst heating operation, where possible, and 2) to ensure that exhaust catalyst temperature is within a threshold (e.g. within 30 degrees C. or less, 20 degrees C. or less, 10 degrees C. or less, 5 degrees C. or less, etc.) of light-off temperature at the time of the scheduled pickup. While it may be desirable to only conduct one heating operation prior to the next scheduled pickup, it may be understood that it may not always be possible to do so, and in some cases more than one heating operation may be conducted without departing from the scope of this disclosure. Furthermore, as will be described in detail below, in some examples even when it is attempted to only conduct one exhaust catalyst heating operation prior to the vehicle being picked up, conditions may be such another heating operation is conducted to maintain exhaust catalyst temperature above light-off temperature.

Accordingly, the software application may communicate with the controller of the vehicle in order to request the controller activate the engine at a particular time, to raise exhaust catalyst temperature to the first threshold temperature. This information may be stored at the controller of the vehicle, and a timer may be set to wake the controller at the specified time.

While the above-discussed instructions are indicated to be provided via the software application, in other examples, all such instructions other than the coordinating of the scheduling of the vehicle pickup time may be stored at the controller as executable instructions in non-transitory memory. For example, the controller of the vehicle may receive the scheduled request via the software application, and the controller of the vehicle may determine whether to use the engine or the electric heater, what time to conduct the heating operation, predetermined threshold temperature to raise the temperature of the exhaust catalyst to, etc., similar to that described above when the instructions are provided via the software application.

Between time t2 and t3, actual exhaust catalyst temperature (plot 820) decays in line with the first modeled exhaust catalyst temperature decay (plot 821). The engine is maintained off between time t2 and t3, and the controller is maintained asleep. The vehicle is not accessed by the second customer between time t2 and t3. While actual exhaust catalyst temperature decay is depicted between time t2 and t3, it may be understood that this is for illustrative purposes, and because the controller is asleep, actual exhaust catalyst temperature is not monitored between time t2 and t3.

At time t3, it may be understood that the first modeled exhaust catalyst temperature is predicted to be within a threshold (not specifically shown) of the light-off temperature represented by line 823. While not specifically illustrated, the threshold may be understood to comprise within 30 degrees C. or less, 20 degrees C. or less, 10 degrees C. or less, 5 degrees C. or less, etc. In response to the predicted exhaust catalyst being within the threshold of light-off temperature, and further in response to the timer elapsing, the controller is awoken in order to conduct the exhaust catalyst temperature raising operation. Accordingly, at time t3, a first exhaust catalyst heating operation is conducted by activating the engine to combust air and fuel. While not explicitly illustrated, it may be understood that in this example, only one of four cylinders are activated to combust air and fuel, and spark provided to the one cylinder is retarded in order to rapidly warm the exhaust catalyst, as discussed above.

With the engine activated, exhaust catalyst temperature rises (plot 820) between time t3 and t4. At time t4, exhaust catalyst temperature reaches the first threshold temperature (plot 824). With the first threshold temperature having been reached at time t4, the engine is deactivated (fuel and spark provided to the cylinder discontinued), and again, an initial measurement of exhaust catalyst temperature is again obtained. Between time t4 and t5, the controller is again cycled through sleep/wake cycles as described above, in order to again model the exponential decay rate of exhaust catalyst temperature, to obtain a second modeled temperature decay represented by dashed line 822. In other words, it may be understood that while the first threshold temperature (dashed line 824) was selected for the exhaust catalyst temperature to be above light-off temperature at the time of pickup without having to conduct another heating operation, but the first threshold temperature is only based on the first modeled temperature decay and other factors that may not be representative of actual exhaust catalyst temperature decay after the first exhaust catalyst heating operation is conducted. Thus, by again modeling the exponential decay of exhaust catalyst temperature based on empirical measurements, a more accurate determination of whether exhaust catalyst temperature is expected to be above light-off temperature at the time of the scheduled pickup may be provided.

In this example timeline, the second modeled temperature decay indicates that the exhaust catalyst temperature is expected to again drop below light-off temperature just prior to the time the vehicle is scheduled to be picked up. Such information is communicated to the software application, which, as above, determines the most appropriate methodology for raising exhaust catalyst temperature (and what temperature to raise the exhaust catalyst to) in order to bias the exhaust catalyst to being at a temperature above light-off temperature at the time of the next scheduled pickup. As above, the determination of what methodology to use may be based on a combination of the second modeled temperature decay (and in some examples the first modeled temperature decay as well), current and forecast weather conditions, and relevant parameters retrieved from the controller of the vehicle such as charge level for the onboard energy storage device, fuel level, etc. Again, as discussed above, in some examples the instructions for determining appropriate methodology for raising exhaust catalyst temperature, predetermined threshold temperature to raise the exhaust catalyst to, etc., may be stored at the controller of the vehicle, rather than the software application.

In this example timeline, it is determined via the software application (or controller of the vehicle) that it is most desirable from a fuel economy and emissions standpoint, to use the electric heater to raise temperature of the exhaust catalyst. Furthermore, the software application (or controller of the vehicle) determines a second threshold temperature (represented by dashed line 825) to raise the exhaust catalyst to, such that it is likely that the exhaust catalyst temperature is above light-off temperature at the time of the scheduled pickup. Such information may be communicated to the controller of the vehicle (provided that the software application determined such instructions), where the information is stored. A timer may be set via the vehicle controller, in order to wake the controller at the time near when exhaust catalyst temperature is predicted to drop below light-of temperature.

Accordingly, between time t5 and 6, the controller is slept, and exhaust catalyst temperature declines. At time t6, the timer elapses, and the controller is woken in order to conduct the second exhaust catalyst heating operation. Accordingly, at time t6, the electric heater is actuated on via a command from the controller to the electric heater actuator (plot 810). With the electric heater activated, temperature of the exhaust catalyst increases between time t6 and t7, and by time t7 the second threshold temperature (plot 825) is attained. With the second threshold temperature having been attained, the electric heater is turned off at time t7, and the controller is again slept. While not explicitly illustrated, it may be understood that yet another set of measurements may be obtained related to exhaust catalyst temperature, similar to that discussed above between time t1 and t2, and between time t4 and t5. In this way, a third modeled temperature decay (not shown) may be obtained, which may be used to ensure that exhaust catalyst temperature be above light-off temperature at the time of the scheduled vehicle pickup.

In this example timeline, between time t7 and t8, exhaust catalyst temperature decays. At time t8, the vehicle is picked up by the second customer (plot 835). With the vehicle having been accessed at time t8, the controller is triggered to the awake mode (plot 830). At time t9, the engine is activated, and between time t9 and t10, the vehicle is driven and exhaust catalyst temperature increases in line with operation of the engine. Thus, at the time of pickup in this example timeline, exhaust catalyst temperature is maintained above light-off temperature until the vehicle is retrieved by the second customer. Accordingly, the engine is activated at the time of pickup by the second customer under conditions where exhaust catalyst temperature is above light-off temperature, thus reducing emissions and improving fuel economy as compared to situations where the engine is activated under cold-start conditions.

In this way, exhaust catalyst temperature may be maintained above light-off temperature until next scheduled vehicle pickup events, such that engine-start events at the next scheduled pickup events are less polluting and better in terms of fuel economy than cold-start events. In this way, emissions may be reduced for vehicles participating in car-sharing models.

The technical effect is to recognize that for vehicles participating in car-sharing models, because requested pickup time and location is scheduled in advance, it may be possible to coordinate exhaust catalyst temperature to be above light-off temperature for requested pickup events in an environmentally friendly fashion that reduces overall emissions for a fleet of vehicles participating in the car-sharing model. It is further recognized that by learning customer drive habits and/or via V2I2V technology, it may be inferred as to when a subsequent engine restart request may be received at the vehicle controller.

Thus, one technical effect is to recognize that in order to accurately indicate when exhaust catalyst temperature is predicted to decay to below light-off temperature, empirical measurements of exhaust catalyst temperature may be obtained after an engine-off event which may be used to model exhaust catalyst decay rate. Another technical effect is to recognize that an amount by which the exhaust catalyst temperature is raised to for a particular exhaust catalyst heating operation may be a function of when the vehicle is next scheduled to be picked up by a customer (or other inferred subsequent engine restart request) to avoid increasing exhaust catalyst temperatures to levels not necessarily advantageous (e.g. raising temperatures either too high or too low) for maintaining exhaust catalyst temperature above light-off temperature at the time of the next requested pickup (or other inferred subsequent engine restart request). Still another technical effect is to recognize that there may in some cases be advantages in terms of fuel economy and emissions to use the engine to raise exhaust catalyst temperature, whereas in other examples there may be advantages to using an electric heater coupled to the exhaust catalyst (where applicable) to raise exhaust catalyst temperature. Another technical effect is to recognize that in some examples where more than one exhaust catalyst heating operation is conducted in order to maintain exhaust catalyst temperature above light-off temperature until the next vehicle pickup event, it may be advantageous to use the engine for one or more exhaust catalyst temperature raising operations and to use the electric heater for another one or more exhaust catalyst temperature raising operations. Yet another technical effect is to recognize that via the use of a software application, environmentally friendly vehicle pickup events for vehicles participating in car-sharing models may be routinely scheduled and organized in order to reduce overall emissions and improve fuel economy for such vehicles.

In another representation, a method may comprise tracking a plurality of vehicles, engine-off times, and respective temperatures of an exhaust catalyst at each vehicle, and providing a recommendation of a vehicle to a prospective car share operator or customer responsive to a user preference for reduced emissions. In one example, tracking the plurality of vehicles may be via a software application, such as the software application depicted above at FIGS. 5A-6. The engine-off times may relate to a duration of time since an engine corresponding to one or more of the plurality of vehicles was deactivated. The prospective car share operator may request use of a vehicle comprising one of the plurality of vehicles, via the software application. The respective temperatures of the exhaust catalyst may be relied upon for predicting when an exhaust catalyst temperature is expected to drop below a threshold temperature (e.g. light-off temperature). The recommendation of the vehicle to the prospective care share operator or customer may comprise a vehicle for which exhaust catalyst temperature is above the threshold temperature at a time the vehicle is picked up via the prospective car share operator.

The systems and methods described above may enable one or more systems and one or more methods. In one example, a method comprises while a vehicle is stationary with an engine not combusting air and fuel, actively raising a temperature of an exhaust catalyst positioned in an exhaust system of the engine to maintain the temperature of the exhaust catalyst above a threshold temperature until a subsequent request for engine torque to propel the vehicle is requested. In a first example of the method, the method may include wherein the conditions where the vehicle is stationary with the engine not combusting air and fuel further comprise the vehicle being unoccupied. A second example of the method optionally includes the first example, and further includes wherein the vehicle is one of a plurality of vehicles participating in a car-sharing model, and where the subsequent request for engine torque to propel the vehicle is related to a scheduled pickup time of the vehicle by a customer. A third example of the method optionally includes any one or more or each of the first and second examples, and further includes wherein the conditions where the vehicle is stationary with the engine not combusting air and fuel include a start/stop event where the engine is deactivated and where the vehicle is occupied. A fourth example of the method optionally includes any one or more or each of the first through third examples, and further includes wherein actively raising the temperature of the exhaust catalyst includes activating the engine to combust air and fuel. A fifth example of the method optionally includes any one or more or each of the first through fourth examples, and further includes wherein actively raising the temperature of the exhaust catalyst includes activating an electric heater coupled to the exhaust catalyst. A sixth example of the method optionally includes any one or more or each of the first through fifth examples, and further comprises actively raising the temperature of the exhaust catalyst to maintain the temperature of the exhaust catalyst above the threshold temperature under conditions where it is inferred that the subsequent request for engine torque to propel the vehicle is within a threshold duration of time from the time the engine was commanded to stop combusting air and fuel. A seventh example of the method optionally includes any one or more or each of the first through sixth examples and further comprises actively raising the temperature of the exhaust catalyst positioned in the exhaust system when the temperature of the exhaust catalyst is predicted to be within a threshold number of degrees of the threshold temperature. An eighth example of the method optionally includes any one or more or each of the first through seventh examples, and further comprises obtaining a plurality of measurements corresponding to the temperature of the exhaust catalyst while the vehicle is stationary with the engine not combusting air and fuel, and regressing the plurality of measurements into an exponential decay formula in order to predict when the temperature of the exhaust catalyst will be within the threshold number of degrees of the threshold temperature.

Another example of a method comprises at an engine-off event for a vehicle, via a controller, obtaining a series of temperatures of an exhaust catalyst and extrapolating a predicted time after the engine-off event that the temperature of the exhaust catalyst is expected to drop below a threshold temperature; and responsive to a scheduled subsequent request for engine torque to propel the vehicle being after the predicted time and within a threshold duration of the engine-off event, actively raising the temperature of the exhaust catalyst to maintain the temperature above the threshold temperature at the time of the scheduled subsequent request. In a first example of the method, the method further includes wherein the vehicle is participating in a car-sharing model; and wherein the scheduled subsequent request for engine torque to propel the vehicle is related to a scheduled pickup time of the vehicle via a customer, where the scheduled pickup time is received via the controller of the vehicle via wireless communication between the controller and a software application that coordinates pickup times and locations of the vehicle in response to requests from customers. A second example of the method optionally includes the first example, and further includes wherein an amount that the temperature is actively raised to is variable depending on a relationship between the predicted time after the engine-off event that the temperature is expected to drop below the threshold temperature and the scheduled subsequent request for engine torque. A third example of the method optionally includes any one or more or each of the first through second examples, and further includes wherein the amount that the temperature is actively raised to is increased when a difference between the predicted time and the scheduled subsequent request increases; and wherein the amount that the temperature is actively raise to is decreased when the difference between the predicted time and the scheduled subsequent request decreases. A fourth example of the method optionally includes any one or more or each of the first through third examples, and further includes wherein obtaining the series of temperatures of the exhaust catalyst further comprises obtaining a temperature measurement of the exhaust catalyst while the controller is awake and then sleeping the controller for a predetermined time before waking the controller to obtain another temperature measurement pertaining to the temperature of the exhaust catalyst; and wherein the series of temperatures comprises a predetermined number of temperature measurements for extrapolating the predicted time after the engine-off event that the temperature of the exhaust catalyst is expected to drop below the threshold temperature. A fifth example of the method optionally includes any one or more or each of the first through fourth examples, and further includes wherein actively raising the temperature of the exhaust catalyst includes one of activating the engine to combust air and fuel, or activating an electric heater coupled to the exhaust catalyst. A sixth example of the method optionally includes any one or more or each of the first through fifth examples, and further includes wherein whether the temperature of the exhaust catalyst is raised via activating the engine or via activating the electric heater is based on which method of actively raising the temperature of the exhaust catalyst is more beneficial in terms of fuel economy and emissions.

An example of a system for a vehicle participating in a car-sharing model comprises an exhaust catalyst positioned in an exhaust of an engine of the vehicle and a temperature sensor coupled to the exhaust catalyst for monitoring temperature of the exhaust catalyst; and a controller with computer readable instructions stored on non-transitory memory that when executed cause the controller to: in response to an engine-off event, obtain a plurality of measurements pertaining to a temperature of the exhaust catalyst in order to infer a time, during the engine-off event, that the temperature of the exhaust catalyst is likely to drop below a threshold temperature; via a software application that communicates wirelessly with the controller, receive a scheduled pickup time of the vehicle based on a request from a customer using a software application; and in response to the scheduled pickup time being within a threshold duration from the engine-off event, and further in response to the scheduled pickup time being after the time that the temperature of the exhaust catalyst is likely to drop below the threshold temperature, actively raise the temperature of the exhaust catalyst in order to maintain the temperature of the exhaust catalyst above the threshold temperature until the scheduled pickup time of the vehicle. In a first example of the system, the system may further include wherein the controller stores further instructions to activate the engine to combust air and fuel in order to actively raise the temperature of the exhaust catalyst. A second example of the system optionally includes any one or more or each of the first and second examples, and further comprises an electric heater coupled to the exhaust catalyst; and wherein the controller stores further instructions to select whether to utilize the engine in order to actively raise the temperature of the exhaust catalyst, or to use the electric heater to actively raise the temperature of the exhaust catalyst. A third example of the system optionally includes any one or more or each of the first through second examples, and further includes wherein the controller stores further instructions to actively raise the temperature to a predetermined level, the predetermined level a function of a time difference between the time that the temperature of the exhaust catalyst is likely to drop below the threshold temperature and the scheduled pickup time.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
while a vehicle is stationary with an engine not combusting air and fuel, actively raising a temperature of an exhaust catalyst positioned in an exhaust system of the engine to maintain the temperature of the exhaust catalyst above a threshold temperature until a subsequent request for engine torque to propel the vehicle is requested;
actively raising the temperature of the exhaust catalyst positioned in the exhaust system when the temperature of the exhaust catalyst is predicted to be within a threshold number of degrees of the threshold temperature; and
obtaining a plurality of measurements corresponding to the temperature of the exhaust catalyst while the vehicle is stationary with the engine not combusting air and fuel, and regressing the plurality of measurements into an exponential decay formula in order to predict when the temperature of the exhaust catalyst will be within the threshold number of degrees of the threshold temperature.

2. The method of claim 1, wherein conditions where the vehicle is stationary with the engine not combusting air and fuel further comprise the vehicle being unoccupied.

3. The method of claim 2, wherein the vehicle is one of a plurality of vehicles participating in a car-sharing model, and where the subsequent request for engine torque to propel the vehicle is related to a scheduled pickup time of the vehicle by a customer.

4. The method of claim 1, wherein conditions where the vehicle is stationary with the engine not combusting air and fuel include a start/stop event where the engine is deactivated and where the vehicle is occupied.

5. The method of claim 1, wherein actively raising the temperature of the exhaust catalyst includes activating the engine to combust air and fuel.

6. The method of claim 1, wherein actively raising the temperature of the exhaust catalyst includes activating an electric heater coupled to the exhaust catalyst.

7. The method of claim 1, further comprising actively raising the temperature of the exhaust catalyst to maintain the temperature of the exhaust catalyst above the threshold temperature under conditions where it is inferred that the subsequent request for engine torque to propel the vehicle is within a threshold duration of time from a time the engine was commanded to stop combusting air and fuel.

8. A method comprising:
at an engine-off event for a vehicle, by way of a controller, obtaining a series of temperatures of an exhaust catalyst and extrapolating a predicted time after the engine-off event that the temperature of the exhaust catalyst is expected to drop below a threshold temperature; and
responsive to a scheduled subsequent request for engine torque to propel the vehicle being after the predicted time and within a threshold duration of the engine-off event, actively raising the temperature of the exhaust catalyst to maintain the temperature above the threshold temperature at a time of the scheduled subsequent request.

9. The method of claim 8, wherein the vehicle is participating in a car-sharing model; and
wherein the scheduled subsequent request for engine torque to propel the vehicle is related to a scheduled pickup time of the vehicle a customer, where the scheduled pickup time is received via the controller of the vehicle via wireless communication between the controller and a software application that coordinates pickup times and locations of the vehicle in response to requests from customers.

10. The method of claim 8, wherein an amount that the temperature is actively raised to is variable depending on a relationship between the predicted time after the engine-off event that the temperature is expected to drop below the threshold temperature and the scheduled subsequent request for engine torque.

11. The method of claim 10, wherein the amount that the temperature is actively raised to is increased when a difference between the predicted time and the scheduled subsequent request increases; and
wherein the amount that the temperature is actively raise to is decreased when the difference between the predicted time and the scheduled subsequent request decreases.

12. The method of claim 8, wherein obtaining the series of temperatures of the exhaust catalyst further comprises obtaining a temperature measurement of the exhaust catalyst while the controller is awake and then sleeping the controller for a predetermined time before waking the controller to obtain another temperature measurement pertaining to the temperature of the exhaust catalyst; and
wherein the series of temperatures comprises a predetermined number of temperature measurements for extrapolating the predicted time after the engine-off event that the temperature of the exhaust catalyst is expected to drop below the threshold temperature.

13. The method of claim 8, wherein actively raising the temperature of the exhaust catalyst includes one of activating the engine to combust air and fuel, or activating an electric heater coupled to the exhaust catalyst.

14. The method of claim 13, wherein whether the temperature of the exhaust catalyst is raised by way of activating the engine or via activating the electric heater is based on which method of actively raising the temperature of the exhaust catalyst is more beneficial in terms of fuel economy and emissions.

15. A system for a vehicle participating in a car-sharing model, comprising:
an exhaust catalyst positioned in an exhaust of an engine of the vehicle and a temperature sensor coupled to the exhaust catalyst for monitoring temperature of the exhaust catalyst; and
a controller with computer readable instructions stored on non-transitory memory that when executed cause the controller to:
in response to an engine-off event, obtain a plurality of measurements pertaining to a temperature of the exhaust catalyst in order to infer a time, during the engine-off event, that the temperature of the exhaust catalyst is likely to drop below a threshold temperature;
by way of a software application that communicates wirelessly with the controller, receive a scheduled pickup time of the vehicle based on a request from a customer using a software application; and
in response to the scheduled pickup time being within a threshold duration from the engine-off event, and further in response to the scheduled pickup time being after a time that the temperature of the exhaust catalyst is likely to drop below the threshold temperature, actively raise the temperature of the exhaust catalyst in order to maintain the temperature of the exhaust catalyst above the threshold temperature until the scheduled pickup time of the vehicle.

16. The system of claim 15, wherein the controller stores further instructions to activate the engine to combust air and fuel in order to actively raise the temperature of the exhaust catalyst.

17. The system of claim 16, further comprising an electric heater coupled to the exhaust catalyst; and
   wherein the controller stores further instructions to select whether to utilize the engine in order to actively raise the temperature of the exhaust catalyst, or to use the electric heater to actively raise the temperature of the exhaust catalyst.

18. The system of claim 15, wherein the controller stores further instructions to actively raise the temperature to a predetermined level, the predetermined level a function of a time difference between the time that the temperature of the exhaust catalyst is likely to drop below the threshold temperature and the scheduled pickup time.

* * * * *